US011295327B2

(12) United States Patent
Cooper et al.

(10) Patent No.: US 11,295,327 B2
(45) Date of Patent: *Apr. 5, 2022

(54) METERING APPARATUS AND RELATED METHODS

(71) Applicant: The Nielsen Company (US), LLC, New York, NY (US)

(72) Inventors: Timothy Scott Cooper, Oldsmar, FL (US); James Joseph Vitt, Palm Harbor, FL (US); Douglas Brent Turnbow, Odessa, FL (US); Christen V. Nielsen, Palm Harbor, FL (US); Marko Usaj, Ljubljana (SI); Andrej Barbis, Ilirska Bistrica (SI); Saso Vranek, Ilirska Bistrica (SI)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/418,690

(22) Filed: May 21, 2019

(65) Prior Publication Data

US 2019/0272554 A1 Sep. 5, 2019

Related U.S. Application Data

(63) Continuation of application No. 15/981,398, filed on May 16, 2018, which is a continuation of application (Continued)

(51) Int. Cl.
*G06Q 30/02* (2012.01)
*H04N 21/442* (2011.01)
(Continued)

(52) U.S. Cl.
CPC ......... *G06Q 30/0204* (2013.01); *G06F 3/167* (2013.01); *G08B 3/10* (2013.01);
(Continued)

(58) Field of Classification Search
None
See application file for complete search history.

(56) References Cited

U.S. PATENT DOCUMENTS

| 3,665,889 | A | 5/1972 | Wagenvoord |
| 4,566,033 | A | 1/1986 | Reidenouer |

(Continued)

FOREIGN PATENT DOCUMENTS

| CN | 101371472 | 2/2009 |
| EP | 2261927 | 12/2010 |

(Continued)

OTHER PUBLICATIONS

European Patent Office, "Extended European Search Report," issued in connection with European Patent Application No. 18215594.5, dated May 7, 2019, 7 pages.

(Continued)

*Primary Examiner* — Curtis A Kuntz
*Assistant Examiner* — Jerold B Murphy
(74) *Attorney, Agent, or Firm* — Hanley, Flight & Zimmerman, LLC

(57) ABSTRACT

Example metering apparatus and related methods are disclosed. An example apparatus disclosed herein includes a stencil and a housing having a display area. The display area has a first recessed cavity and a second recessed cavity adjacent the first recessed cavity. The first recessed cavity is offset relative to the second recessed cavity such that the second recessed cavity defines a front surface of the display area and a peripheral lip of a front side of the housing. A cover is removably coupled to the housing to enable access to the display area. The second recessed cavity of the housing is to receive the cover. The cover is received by the second recessed cavity such that an outer surface of the cover is substantially flush mounted relative to a peripheral (Continued)

lip of the housing, and wherein a perimeter of the cover is substantially similar to a perimeter of the peripheral lip.

19 Claims, 17 Drawing Sheets

Related U.S. Application Data

No. 15/192,560, filed on Jun. 24, 2016, now Pat. No. 9,984,380.

(51) Int. Cl.

| G08B 3/10 | (2006.01) |
|---|---|
| G08B 5/36 | (2006.01) |
| G06F 3/16 | (2006.01) |
| H04N 21/81 | (2011.01) |

(52) U.S. Cl.
CPC ......... *G08B 5/36* (2013.01); *H04N 21/44204* (2013.01); *H04N 21/44218* (2013.01); *H04N 21/44222* (2013.01); *H04N 21/812* (2013.01)

(56) References Cited

U.S. PATENT DOCUMENTS

| | | | |
|---|---|---|---|
| 4,652,337 A | 3/1987 | Picone et al. | |
| 4,765,080 A | 8/1988 | Conti | |
| 4,817,194 A | 3/1989 | Andros, Jr. | |
| 4,905,080 A | 2/1990 | Watanabe et al. | |
| 5,023,929 A | 6/1991 | Call | |
| 5,102,081 A | 4/1992 | Barchus | |
| 5,235,414 A | 8/1993 | Cohen | |
| 5,450,490 A | 9/1995 | Jensen et al. | |
| 5,481,294 A * | 1/1996 | Thomas | H04H 20/31 348/180 |
| 5,521,578 A * | 5/1996 | DelValle | G08B 5/36 340/286.01 |
| 5,573,328 A | 11/1996 | Hwang | |
| 5,828,992 A | 10/1998 | Kusmierczyk | |
| 5,870,156 A * | 2/1999 | Heembrock | G02F 1/133553 349/110 |
| 6,367,180 B2 | 4/2002 | Weiss et al. | |
| 6,401,373 B1 | 6/2002 | Sexton | |
| 6,467,089 B1 | 10/2002 | Aust et al. | |
| 6,484,316 B1 | 11/2002 | Lindberg | |
| 7,864,120 B2 * | 1/2011 | Dou | H01Q 1/2266 343/702 |
| 7,882,514 B2 | 2/2011 | Nielsen et al. | |
| 7,978,176 B2 | 7/2011 | Forstall et al. | |
| 8,035,497 B2 | 10/2011 | Ciccaglione et al. | |
| 8,678,624 B2 | 3/2014 | Cave et al. | |
| 8,717,285 B1 | 5/2014 | White et al. | |
| 8,776,103 B2 | 7/2014 | Lu et al. | |
| 9,016,906 B2 | 4/2015 | Cave et al. | |
| 9,148,695 B2 | 9/2015 | Nielsen | |
| 9,161,084 B1 | 10/2015 | Sharma et al. | |
| 9,197,930 B2 | 11/2015 | Lee | |
| 9,984,380 B2 * | 5/2018 | Cooper | H04N 21/44218 |
| 10,178,433 B2 | 1/2019 | Cooper et al. | |
| 10,405,036 B2 | 9/2019 | Cooper et al. | |
| 2002/0017045 A1* | 2/2002 | Weiss | G09F 13/0409 40/580 |
| 2004/0221754 A1 | 11/2004 | Cochran et al. | |
| 2005/0028692 A1 | 2/2005 | Mellis | |
| 2007/0055290 A1 | 3/2007 | Lober | |
| 2008/0049434 A1 | 2/2008 | Marsh | |
| 2008/0136736 A1* | 6/2008 | Proctor | H01Q 1/38 343/893 |
| 2008/0263579 A1* | 10/2008 | Mears | H04N 21/435 725/9 |
| 2009/0052713 A1 | 2/2009 | Abe | |
| 2009/0081823 A1 | 3/2009 | Meeus et al. | |
| 2011/0050656 A1 | 3/2011 | Sakata et al. | |
| 2011/0311083 A1 | 12/2011 | Bennett | |
| 2012/0023516 A1 | 1/2012 | Wolinsky et al. | |
| 2012/0081898 A1* | 4/2012 | Cave | F21V 15/01 362/249.01 |
| 2012/0127012 A1 | 5/2012 | Gicklhorn et al. | |
| 2013/0258084 A1* | 10/2013 | Deng | H04N 21/44218 348/77 |
| 2014/0111964 A1 | 4/2014 | Cave et al. | |
| 2014/0137143 A1 | 5/2014 | Ramaswamy et al. | |
| 2015/0054694 A1 | 2/2015 | Chen et al. | |
| 2015/0055329 A1 | 2/2015 | Demourtzidis | |
| 2015/0281775 A1 | 10/2015 | Ramaswamy et al. | |
| 2015/0365714 A1 | 12/2015 | Gildfind et al. | |
| 2016/0049736 A1* | 2/2016 | Liu | H01Q 21/28 343/893 |
| 2016/0109263 A1 | 4/2016 | Dubs | |
| 2016/0357055 A1* | 12/2016 | Yeo | G02F 1/133608 |
| 2017/0372340 A1 | 12/2017 | Cooper et al. | |
| 2017/0374413 A1 | 12/2017 | Cooper et al. | |
| 2017/0374415 A1* | 12/2017 | Cooper | H04N 21/44218 |
| 2018/0260831 A1* | 9/2018 | Cooper | G06Q 30/0204 |
| 2019/0090015 A1 | 3/2019 | Cooper et al. | |
| 2019/0272554 A1 | 9/2019 | Cooper et al. | |
| 2019/0349632 A1 | 11/2019 | Cooper et al. | |

FOREIGN PATENT DOCUMENTS

| | | |
|---|---|---|
| EP | 3499185 | 6/2019 |
| JP | 08161079 | 6/1996 |
| JP | 2008182608 | 8/2008 |
| JP | 2010109760 | 5/2010 |
| WO | 9927668 | 6/1999 |
| WO | 2005032144 | 4/2005 |
| WO | 2013056193 | 4/2013 |
| WO | 2017223333 | 12/2017 |

OTHER PUBLICATIONS

European Patent Office, "Extended European Search Report," issued in connection with European Patent Application No. 18215638.0, dated Apr. 24, 2019, 9 pages.

International Searching Authority, "International Search Report," issued in connection with International Patent Application No. PCT/US2017/038784, dated Oct. 27, 2017, 5 pages.

International Searching Authority, "Written Opinion," issued in connection with International Patent Application No. PCT/US2017/038784, dated Oct. 27, 2017, 11 pages.

United States Patent and Trademark Office, "Non-Final Office Action," issued in connection with U.S. Appl. No. 15/192,539 dated Jan. 10, 2018, 32 pages.

United States Patent and Trademark Office, "Final Office Action," issued in connection with U.S. Appl. No. 15/192,539 dated Jun. 29, 2018, 25 pages.

United States Patent and Trademark Office, "Non-Final Office Action," issued in connection with U.S. Appl. No. 15/192,554 dated Jan. 16, 2018, 34 pages.

United States Patent and Trademark Office, "Notice of Allowance," issued in connection with U.S. Appl. No. 15/192,554 dated Aug. 2, 2018, 5 pages.

United States Patent and Trademark Office, "Non-Final Office Action," issued in connection with U.S. Appl. No. 15/192,560, dated Jun. 28, 2017, 18 pages.

United States Patent and Trademark Office, "Final Office Action," issued in connection with U.S. Appl. No. 15/192,560, dated Oct. 16, 2017, 17 pages.

United States Patent and Trademark Office, "Notice of Allowance," issued in connection with U.S. Appl. No. 15/192,560, dated Jan. 31, 2018, 9 pages.

International Bureau, "International Preliminary Report on Patentability," issued in connection with International Patent Application No. PCT/US2017/038784, dated Jan. 3, 2019, 13 pages.

United States Patent and Trademark Office, "Notice of Allowance and Fee(s) Due," issued in connection with U.S. Appl. No. 15/192,539 dated Apr. 9, 2019, 24 pages.

(56) References Cited

OTHER PUBLICATIONS

United States Patent and Trademark Office, "Non-Final Office Action," issued in connection with U.S. Appl. No. 15/192,539 dated Nov. 29, 2018, 12 pages.
European Patent Office, "Extended European Search Report," issued in connection with European Patent Application No. 17816218.6, dated Dec. 18, 2019, 8 pages.
Canadian Intellectual Property Office, "Examination Report," issued in connection with Canadian Patent Application No. 3,028,702, dated Nov. 7, 2019, 3 pages.
United States Patent and Trademark Office, "Final Office Action," issued in connection with U.S. Appl. No. 15/981,398, dated Nov. 4, 2019, 19 pages.
United States Patent and Trademark Office, "Non-Final Office Action," issued in connection with U.S. Appl. No. 16/192,394, dated Mar. 5, 2020, 6 pages.
United States Patent and Trademark Office, "Advisory Action," issued in connection with U.S. Appl. No. 15/981,398, dated Apr. 2, 2020, 3 pages.
European Patent Office, Communication pursuant to Article 94(3) EPC, issued in connection with European Patent Application No. 18 215 638.0, dated Feb. 24, 2020, 7 pages.
United States Patent and Trademark Office, "Notice of Allowance and Fee(s) Due," issued in connection with U.S. Appl. No. 15/192,539, dated Apr. 9, 2019, 9 pages.
United States Patent and Trademark Office, "Non-Final Office Action," issued in connection with U.S. Appl. No. 15/981,398, dated Jun. 27, 2019, 17 pages.
United States Patent and Trademark Office, "Notice of Allowance and Fee(s) Due," issued in connection with U.S. Appl. No. 15/981,398 dated Jan. 24, 2019, 8 pages.
European Patent Office, "Communication pursuant to rule 69(EPC)," issued in connection with European Patent Application No. 18215638.0, dated Jun. 25, 2019, 2 pages.
China National Intellectual Property Administration, "First Notification of Office Action," issued in connection with Chinese Patent Application No. 201780040741.4, dated Jul. 29, 2020, 13 pages.
United States Patent and Trademark Office, "Notice of Allowance and Fee(s) Due," issued in connection with U.S. Appl. No. 16/192,394, dated Jul. 6, 2020, 8 pages.
United States Patent and Trademark Office, "Non-Final Office Action," issued in connection with U.S. Appl. No. 16/518,499, dated May 27, 2020, 10 pages.
United States Patent and Trademark Office, "Non-Final Office Action," issued in connection with U.S. Appl. No. 15/981,398, dated May 15, 2020, 18 pages.
European Patent Office, "Communication under Rule 71(3) EPC," issued in connection with European Patent Application No. 18215638.0, dated Oct. 28, 2020, 7 pages.
United States Patent and Trademark Office, "Final Office Action," issued in connection with U.S. Appl. No. 15/981,398, dated Nov. 2, 2020, 22 pages.
European Patent Office, "Communication under Rule 71(3) EPC," issued in connection with European Patent Application No. 182155945, dated Mar. 2, 2021, 7 pages.
Canadian Intellectual Property Office, "Office Action," issued in connection with Canadian Patent Application No. 3,028,702, dated Feb. 17, 2021, 4 pages.
European Patent Office, "Extended European Search Report," issued in connection with European Patent Application No. 21161878.0, dated Mar. 29, 2021, 9 pages.
United States Patent and Trademark Office, "Non-Final Office Action," issued in connection with U.S. Appl. No. 15/981,398, dated Apr. 19, 2021, 11 pages.
China National Intellectual Property Administration, "Notification of Second Office Action," issued in connection with Chinese Patent Application No. 201780040741.4, dated Apr. 30, 2021, 14 pages.
United States Patent and Trademark Office, "Notice of Allowance and Fee(s) Due," issued in connection with U.S. Appl. No. 16/518,499, dated Feb. 22, 2021, 8 pages.
United States Patent and Trademark Office, "Notice of Allowance and Fee(s) Due," issued in connection with U.S. Appl. No. 17/039,508, dated Sep. 16, 2021, 8 pages.
United States Patent and Trademark Office, "Notice of Allowance and Fee(s) Due," issued in connection with U.S. Appl. No. 15/981,398, dated Aug. 18, 2021, 8 pages.
United States Patent and Trademark Office, "Non-Final Office Action," issued in connection with U.S. Appl. No. 16/518,499, dated Jun. 23, 2021, 11 pages.
United States Patent and Trademark Office, "Non-Final Office Action," issued in connection with U.S. Appl. No. 15/981,398, dated Jul. 26, 2018, 7 pages.
United States Patent and Trademark Office, "Corrected Notice of Allowability," issued in connection with U.S. Appl. No. 16/192,394, dated Sep. 30, 2020, 2 pages.
United States Patent and Trademark Office, "Corrected Notice of Allowability," issued in connection with U.S. Appl. No. 16/192,394, dated Aug. 20, 2020, 2 pages.

* cited by examiner

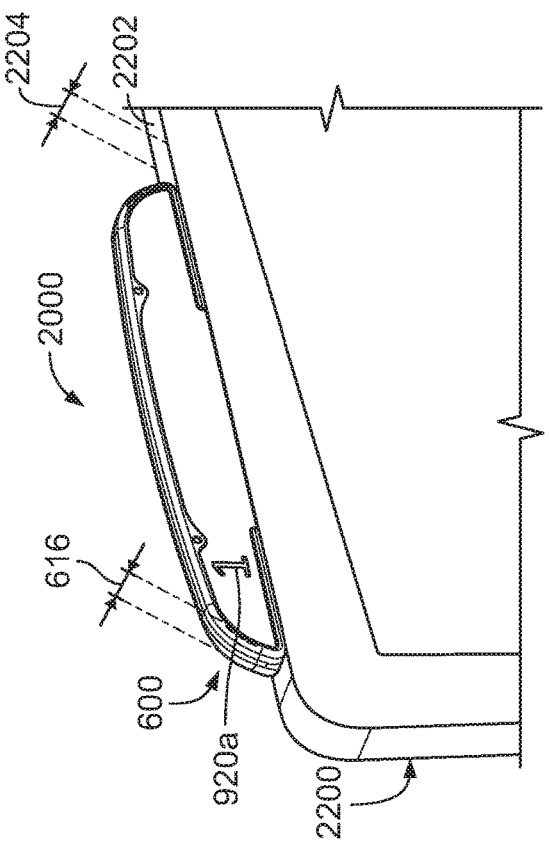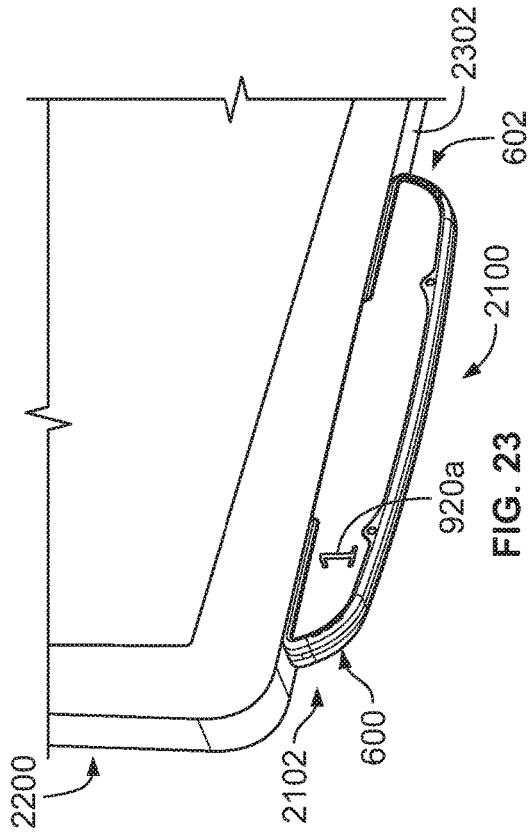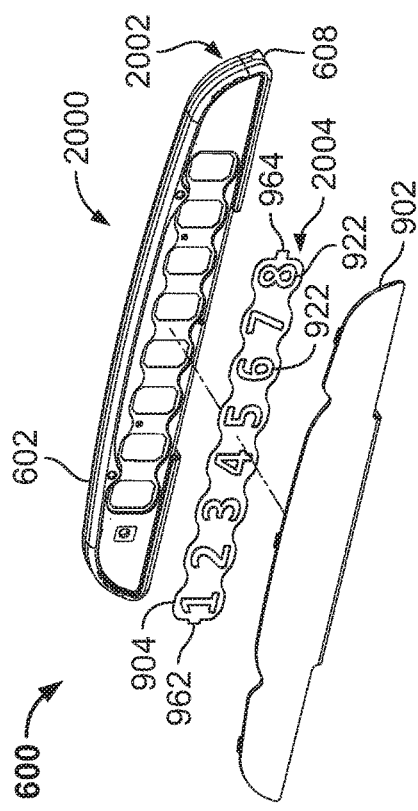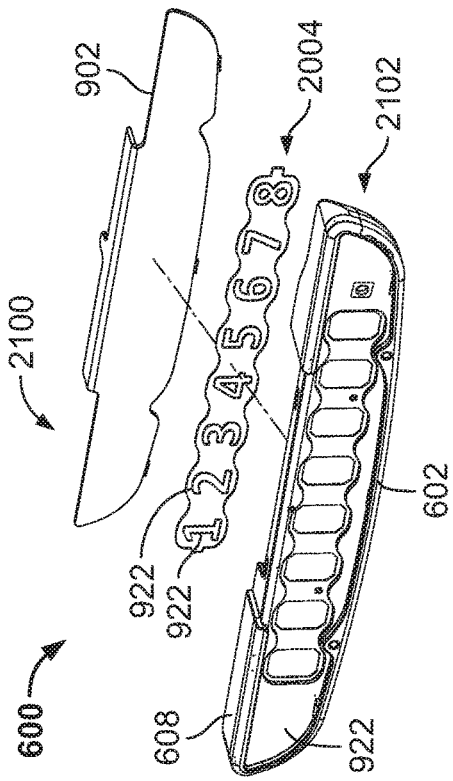

METERING APPARATUS AND RELATED METHODS

CROSS REFERENCE TO RELATED APPLICATIONS

This patent arises from a continuation of U.S. patent application Ser. No. 15/981,398, filed on May 16, 2018, which is a continuation of U.S. patent application Ser. No. 15/192,560, (Now U.S. Pat. No. 9,984,380) filed on Jun. 24, 2016. U.S. patent application Ser. No. 15/981,398 and U.S. patent application Ser. No. 15/192,560 are hereby incorporated herein by reference in their entireties.

Additionally, this patent relates to subject matter disclosed in U.S. patent application Ser. No. 15/192,554, filed on Jun. 24, 2016, entitled invertible metering apparatus and related methods, and U.S. patent application Ser. No. 15/192,539, filed on Jun. 24, 2016, entitled invertible metering apparatus and related methods. U.S. patent application Ser. No. 15/192,554, and U.S. patent application Ser. No. 15/192,539 are incorporated herein by reference in their entireties.

FIELD OF DISCLOSURE

This patent is directed to metering devices and, more specifically, to meter apparatus and related methods.

BACKGROUND

Monitoring companies monitor user interaction with media devices, such as smartphones, tablets, laptops, smart televisions, etc. To facilitate such monitoring, monitoring companies enlist panelists and install meters at the media presentation locations of those panelists. The meters monitor media presentations and transmit media monitoring information to a central facility of the monitoring company. Such media monitoring information enables the media monitoring companies to, among other things, monitor exposure to advertisements, determine advertisement effectiveness, determine user behavior, identify purchasing behavior associated with various demographics, etc.

BRIEF DESCRIPTION OF THE DRAWINGS

FIG. 1 illustrates the example meter in a first mounting orientation.

FIG. 20 is a partially exploded view of the example meter of FIGS. 6-8 shown in a first mounting orientation.

FIG. 21 is a partially exploded view of the example meter of FIGS. 6-8 shown in a second mounting orientation.

FIG. 22 illustrates the example meter of FIGS. 6-8 mounted to a media device in the first mounting configuration.

FIG. 23 illustrates the example meter of FIGS. 6-8 mounted to the media device in the second mounting configuration.

Figure 1:
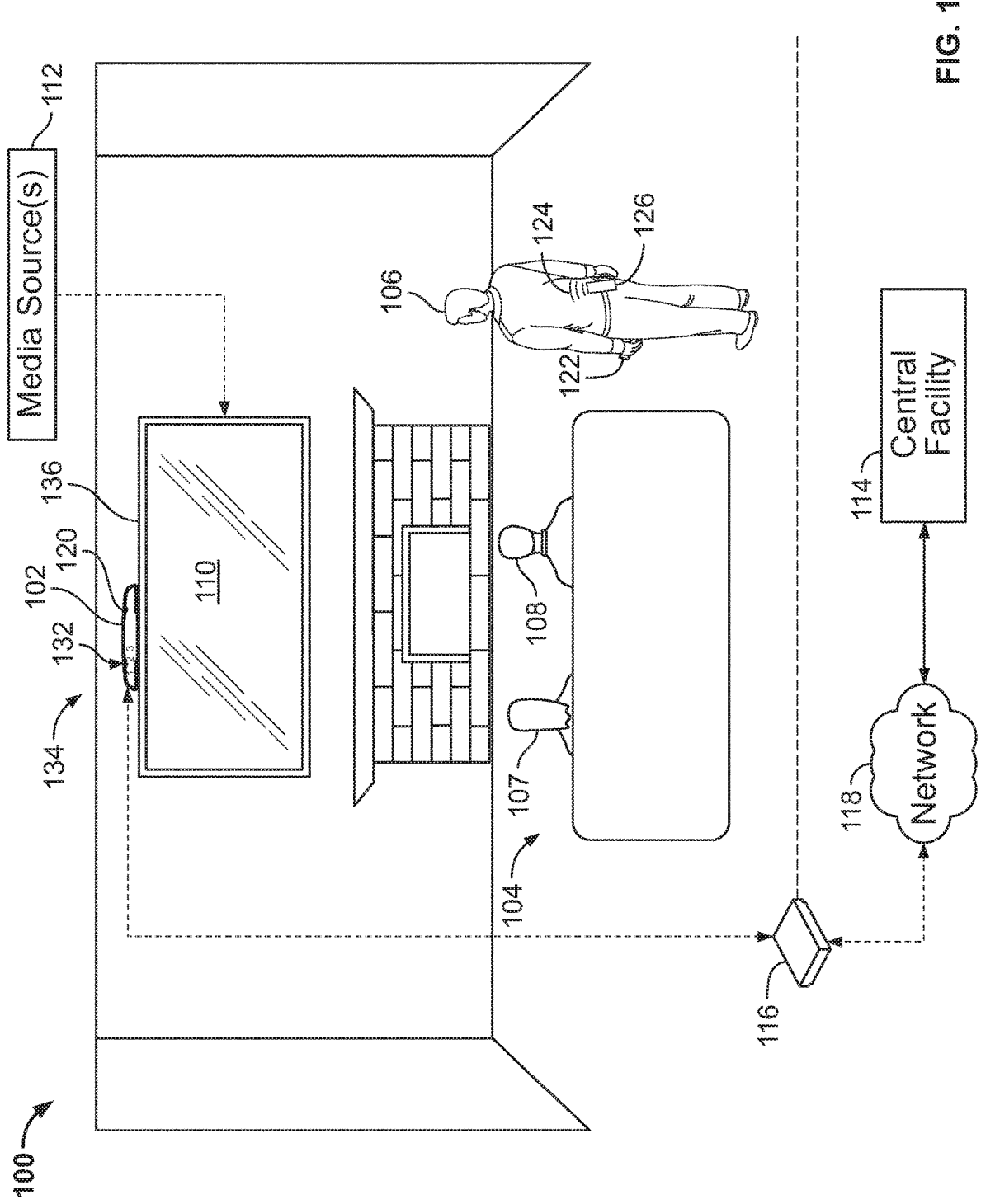
FIG. 1 illustrates an example audience measurement system having an example meter constructed in accordance with the teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact or directly engaged with another part means that there is no intermediate part between the two parts.

DETAILED DESCRIPTION

Audience measurement entities (also referred to herein as "ratings entities" or "monitoring companies") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets. For example, monitoring companies desire knowledge on how users interact with media devices, such as smartphones, tablets, laptops, smart televisions, etc. In particular, media monitoring companies monitor media presentations made at the media devices to, among other things, monitor exposure to advertisements, determine advertisement effectiveness, determine user behavior, identify purchasing behavior associated with various demographics, etc.

As used herein, the term "media" includes any type of content and/or advertisement delivered via any type of distribution medium. Thus, media includes television programming or advertisements, radio programming or advertisements, movies, web sites, streaming media, etc.

FIG. 1 is an illustration of an example audience measurement system 100 having an example meter 102 constructed in accordance with the teachings of this disclosure to monitor an example media presentation environment 104. In the illustrated example of FIG. 1, the media presentation environment 104 includes panelists 106, 107, and 108, an example media device 110 that receives media from an example media source 112, and the meter 102. The meter 102 identifies the media presented by the media device 110 and reports media monitoring information to an example central facility 114 of an audience measurement entity via an example gateway 116 and an example network 118. The example meter 102 of FIG. 1 sends media identification data and/or audience identification data to the central facility 114 periodically, a-periodically and/or upon request by the central facility 114.

In the illustrated example of FIG. 1, the media presentation environment 104 is a room of a household (e.g., a room in a home of a panelist, such as the home of a "Nielsen family") that has been statistically selected to develop media (e.g., television) ratings data for a population/demographic of interest. In the illustrated example of FIG. 1, the example panelists 106, 107 and 108 of the household have been statistically selected to develop media ratings data (e.g., television ratings data) for a population/demographic of interest. People become panelists via, for example, a user interface presented on a media device (e.g., via the media device 110, via a website, etc.). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.). In some examples, an entire family may be enrolled as a household of panelists. That is, while a mother, a father, a son, and a daughter may each be identified as individual panelists, their viewing activities typically occur within the family's household.

In the illustrated example, one or more panelists 106, 107 and 108 of the household have registered with an audience measurement entity (e.g., by agreeing to be a panelist) and have provided their demographic information to the audience measurement entity as part of a registration process to enable associating demographics with media exposure activities (e.g., television exposure, radio exposure, Internet exposure, etc.). The demographic data includes, for example, age, gender, income level, educational level, marital status, geographic location, race, etc., of a panelist. While the example media presentation environment 104 is a household in the illustrated example of FIG. 1, the example media presentation environment 104 can additionally or alternatively be any other type(s) of environments such as, for example, a theater, a restaurant, a tavern, a retail location, an arena, etc.

In the illustrated example of FIG. 1, the example media device 110 is a television. However, the example media device 110 can correspond to any type of audio, video and/or multimedia presentation device capable of presenting media audibly and/or visually. In some examples, the media device 110 (e.g., a television) may communicate audio to another media presentation device (e.g., an audio/video receiver) for output by one or more speakers (e.g., surround sound speakers, a sound bar, etc.). As another example, the media device 110 can correspond to a multimedia computer system, a personal digital assistant, a cellular/mobile smartphone, a radio, a home theater system, stored audio and/or video played back from a memory such as a digital video recorder or a digital versatile disc, a webpage, and/or any other communication device capable of presenting media to an audience (e.g., the panelists 106, 107 and 108).

The media source 112 may be any type of media provider (s), such as, but not limited to, a cable media service provider, a radio frequency (RF) media provider, an Internet based provider (e.g., IPTV), a satellite media service provider, etc. The media may be radio media, television media, pay per view media, movies, Internet Protocol Television (IPTV), satellite television (TV), Internet radio, satellite radio, digital television, digital radio, stored media (e.g., a compact disk (CD), a Digital Versatile Disk (DVD), a Blu-ray disk, etc.), any other type(s) of broadcast, multicast and/or unicast medium, audio and/or video media presented (e.g., streamed) via the Internet, a video game, targeted broadcast, satellite broadcast, video on demand, etc.

The example media device 110 of the illustrated example shown in FIG. 1 is a device that receives media from the media source 112 for presentation. In some examples, the media device 110 is capable of directly presenting media (e.g., via a display) while, in other examples, the media device 110 presents the media on separate media presentation equipment (e.g., speakers, a display, etc.). Thus, as used herein, "media devices" may or may not be able to present media without assistance from a second device. Media devices are typically consumer electronics. For example, the media device 110 of the illustrated example could be a personal computer, such as a laptop computer, and, thus, capable of directly presenting media (e.g., via an integrated and/or connected display and speakers). In some examples, the media device 110 can correspond to a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB)

Project, etc. Advertising, such as an advertisement and/or a preview of other programming that is or will be offered by the media source 112, etc., is also typically included in the media. While a television is shown in the illustrated example, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

The example meter 102 detects exposure to media and electronically stores monitoring information (e.g., a code detected with the presented media, a signature of the presented media, an identifier of a panelist present at the time of the presentation, a timestamp of the time of the presentation) of the presented media. The stored monitoring information is then transmitted back to the central facility 114 via the gateway 116 and the network 118. While the media monitoring information is transmitted by electronic transmission in the illustrated example of FIG. 1, the media monitoring information may additionally or alternatively be transferred in any other manner, such as, for example, by physically mailing the meter 102, by physically mailing a memory of the meter 102, etc.

The meter 102 of the illustrated example of FIG. 1 combines audience measurement data and people metering data. For example, audience measurement data is determined by monitoring media output by the media device 110 and/or other media presentation device(s), and audience identification data (also referred to as demographic data, people monitoring data, etc.) is determined from people monitoring data provided to the meter 102. Thus, the example meter 102 provides dual functionality of a content measurement meter to collect content measurement data and people meter to collect and/or associate demographic information corresponding to the collected audience measurement data.

For example, the meter 102 of the illustrated example collects media identifying information and/or data (e.g., signature(s), fingerprint(s), code(s), tuned channel identification information, time of exposure information, etc.) and people data (e.g., user identifiers, demographic data associated with audience members, etc.). The media identifying information and the people data can be combined to generate, for example, media exposure data (e.g., ratings data) indicative of amount(s) and/or type(s) of people that were exposed to specific piece(s) of media distributed via the media device 110. To extract media identification data, the meter 102 and/or the audience measurement system 100 extracts and/or processes the collected media identifying information and/or data received by the meter 102, which can be compared to reference data to perform source and/or content identification. Any other type(s) and/or number of media monitoring techniques can be supported by the meter 102.

Depending on the type(s) of metering the meter 102 is to perform, the meter 102 can be physically coupled to the media device 110 or may be configured to capture signals emitted externally by the media device 110 (e.g., free field audio) such that direct physical coupling to the media device 110 is not required. For example, the meter 102 of the illustrated example may employ non-invasive monitoring not involving any physical connection to the media device 110 (e.g., via Bluetooth® connection, WIFI® connection, acoustic watermarking, etc.) and/or invasive monitoring involving one or more physical connections to the media device 110 (e.g., via USB connection, a High Definition Media Interface (HDMI) connection, an Ethernet cable connection, etc.).

In examples disclosed herein, to monitor media presented by the media device 110, the meter 102 of the illustrated example employs audio watermarking techniques and/or signature based-metering techniques. Audio watermarking is a technique used to identify media, such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component of the media. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

For example, the meter 102 of the illustrated example senses audio (e.g., acoustic signals or ambient audio) output (e.g., emitted) by the media device 110. For example, the meter 102 processes the signals obtained from the media device 110 to detect media and/or source identifying signals (e.g., audio watermarks) embedded in portion(s) (e.g., audio portions) of the media presented by the media device 110. To sense ambient audio output by the media device 110, the meter 102 of the illustrated example includes an example acoustic sensor 120 (e.g., a microphone). In some examples, the meter 102 may process audio signals obtained from the media device 110 via a direct cable connection to detect media and/or source identifying audio watermarks embedded in such audio signals. In some examples, the meter 102 may process audio signals and/or video signals to generate respective audio and/or video signatures from the media presented by the media device 110.

To generate exposure data for the media, identification(s) of media to which the audience is exposed are correlated with people data (e.g., presence information) collected by the meter 102. The meter 102 of the illustrated example collects inputs (e.g., audience identification data) representative of the identities of the audience member(s) (e.g., the panelists 106, 107 and 108). In some examples, the meter 102 collects audience identification data by periodically or aperiodically prompting audience members in the monitored media presentation environment 104 to identify themselves as present in the audience. In some examples, the meter 102 responds to predetermined events (e.g., when the media device 110 is turned on, a channel is changed, an infrared control signal is detected, etc.) by prompting the audience member(s) to self-identify. The audience identification data and the exposure data can then be complied with the demographic data collected from audience members such as, for example, the panelists 106, 107 and 108 during registration to develop metrics reflecting, for example, the demographic composition of the audience. The demographic data includes, for example, age, gender, income level, educational level, marital status, geographic location, race, etc., of the panelist.

In some examples, the meter 102 may be configured to receive panelist information via an example input device 122 such as, for example, a remote control, An Apple iPad®, a cell phone, etc.). In such examples, the meter 102 prompts the audience members to indicate their presence by pressing an appropriate input key on the input device 122. The meter 102 of the illustrated example may also determine times at which to prompt the audience members to enter information to the meter 102. In some examples, the meter 102 of FIG. 1 supports audio watermarking for people monitoring, which enables the meter 102 to detect the presence of a panelist-identifying metering device in the vicinity (e.g., in the media presentation environment 104) of the media device 110. For example, the acoustic sensor 120 of the meter 102 is able to sense example audio output 124 (e.g., emitted) by an example panelist-identifying metering device 126 such as, for example, a wristband, a cell phone, etc. that is uniquely associated with a particular panelist. The audio output by the example panelist-identifying metering device 126 may include, for example one or more audio watermarks to facilitate identification of the panelist-identifying metering device 126 and/or the panelist 106 associated with the panelist-identifying metering device 126.

The example gateway 116 of the illustrated example of FIG. 1 is a router that enables the meter 102 and/or other devices in the media presentation environment (e.g., the media device 110) to communicate with the network 118 (e.g., the Internet.)

In some examples, the example gateway 116 facilitates delivery of media from the media source 112 to the media device 110 via the Internet. In some examples, the example gateway 116 includes gateway functionality such as modem capabilities. In some other examples, the example gateway 116 is implemented in two or more devices (e.g., a router, a modem, a switch, a firewall, etc.). The gateway 116 of the illustrated example may communicate with the network 118 via Ethernet, a digital subscriber line (DSL), a telephone line, a coaxial cable, a USB connection, a Bluetooth connection, any wireless connection, etc.

In some examples, the example gateway 116 hosts a Local Area Network (LAN) for the media presentation environment 104. In the illustrated example, the LAN is a wireless local area network (WLAN), and allows the meter 102, the media device 110, etc. to transmit and/or receive data via the Internet. Alternatively, the gateway 116 may be coupled to such a LAN. In some examples, the gateway 116 may be implemented with the example meter 102 disclosed herein. In some examples, the gateway 116 may not be provided. In some such examples, the meter 102 may communicate with the central facility 114 via cellular communication (e.g., the meter 102 may employ a built-in cellular modem).

The network 118 of the illustrated example is a wide area network (WAN) such as the Internet. However, in some examples, local networks may additionally or alternatively be used. Moreover, the example network 118 may be implemented using any type of public or private network, such as, but not limited to, the Internet, a telephone network, a local area network (LAN), a cable network, and/or a wireless network, or any combination thereof.

The central facility 114 of the illustrated example is implemented by one or more servers. The central facility 114 processes and stores data received from the meter 102. For example, the example central facility 114 of FIG. 1 combines audience identification data and program identification data from multiple households to generate aggregated media monitoring information. The central facility 114 generates reports for advertisers, program producers and/or other interested parties based on the compiled statistical data. Such reports include extrapolations about the size and demographic composition of audiences of content, channels and/or advertisements based on the demographics and behavior of the monitored panelists.

In some examples, an audience measurement entity provides the meter 102 to the panelist 106, 107 and 108 (or household of panelists) such that the meter 102 may be installed by the panelist 106, 107 and 108 by simply powering the meter 102 and placing the meter 102 in the media presentation environment 104 and/or near the media device 110 (e.g., near a television set).

As noted above, the meter 102 of the illustrated example provides a combination of media metering and people metering. The example meter 102 of FIG. 1 is a stationary device disposed on or near the media device 110. The meter 102 of FIG. 1 includes its own housing, processor, memory and/or software to perform the desired audience measurement and/or people monitoring functions. In particular, the example meter 102 of the illustrated example provides a relatively low profile and/or dimensional footprint.

Additionally, the example meter 102 of the illustrated example includes a modular display to enable different mounting configurations of the example meter 102 disclosed herein. For example, the meter 102 of the illustrated example may be affixed to the media device 110 in any other orientation such as, for example, above the media device 110, on a side of the media device 110, on the bottom of the media device 110. Alternatively, for example, the meter 102 may not be affixed to the media device 110 and may be placed in a location near the media device 110. The different configurable orientations of the meter 102 enable flexibility of placing the meter 102 in different locations (e.g., on the media device 110, on a ceiling mounted television, a shelf, etc.) depending on footprint constraints of the media presentation environment 104 and/or the media device 110. To this end, the example meter 102 of the illustrated example provides a relatively small or narrow dimensional footprint (e.g., a relatively small thickness and/or height).

In the illustrated example of FIG. 1, the meter 102 is affixed or mounted to the media device 110 in a first mounting orientation 134 that provides an above-media device mounting configuration (e.g., an above-television mounting configuration). For example, the meter 102 of the illustrated example may be coupled (e.g., directly attached) to a surface 138 (e.g., an upper surface) of the media device 110.

Figure 2:
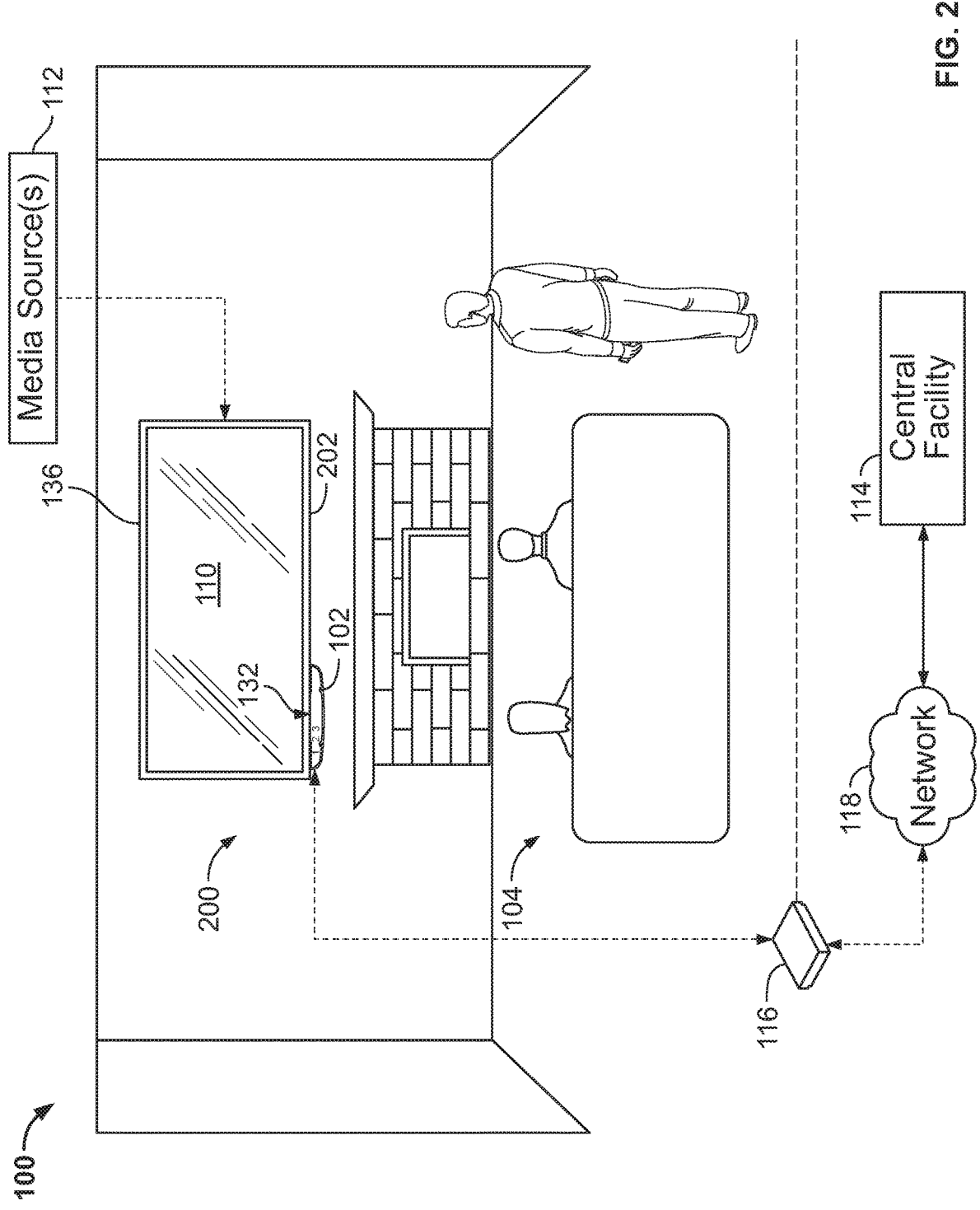
FIG. 2 illustrates the example audience measurement system of FIG. 1 with the example meter in a second mounting orientation.

FIG. 2 illustrates the example media presentation environment 104 of FIG. 1 with the example meter 102 in a second mounting orientation 200. In the second mounting orientation 200, the meter 102 of the illustrated example of FIG. 2 provides a below-media presentation device mounting configuration (e.g., a below-television mounting configuration), which also places the display 132 in a landscape orientation relative to the media device 110. For example, the meter 102 shown in the illustrated example of FIG. 2 is inverted (e.g., upside down) relative to the orientation of the meter 102 shown in FIG. 1. For example, the meter 102 of the illustrated example may be coupled (e.g., directly attached) to a surface 202 (e.g., a lower surface) of the media device 110 (e.g., that is opposite the mounting surface 136). Although the meter 102 provided in the second mounting orientation 200 is flipped upside down compared to the first mounting orientation 134 of FIG. 1, the display 132 of the example meter 102 displays the indicia in an upright orientation.

Figure 3:
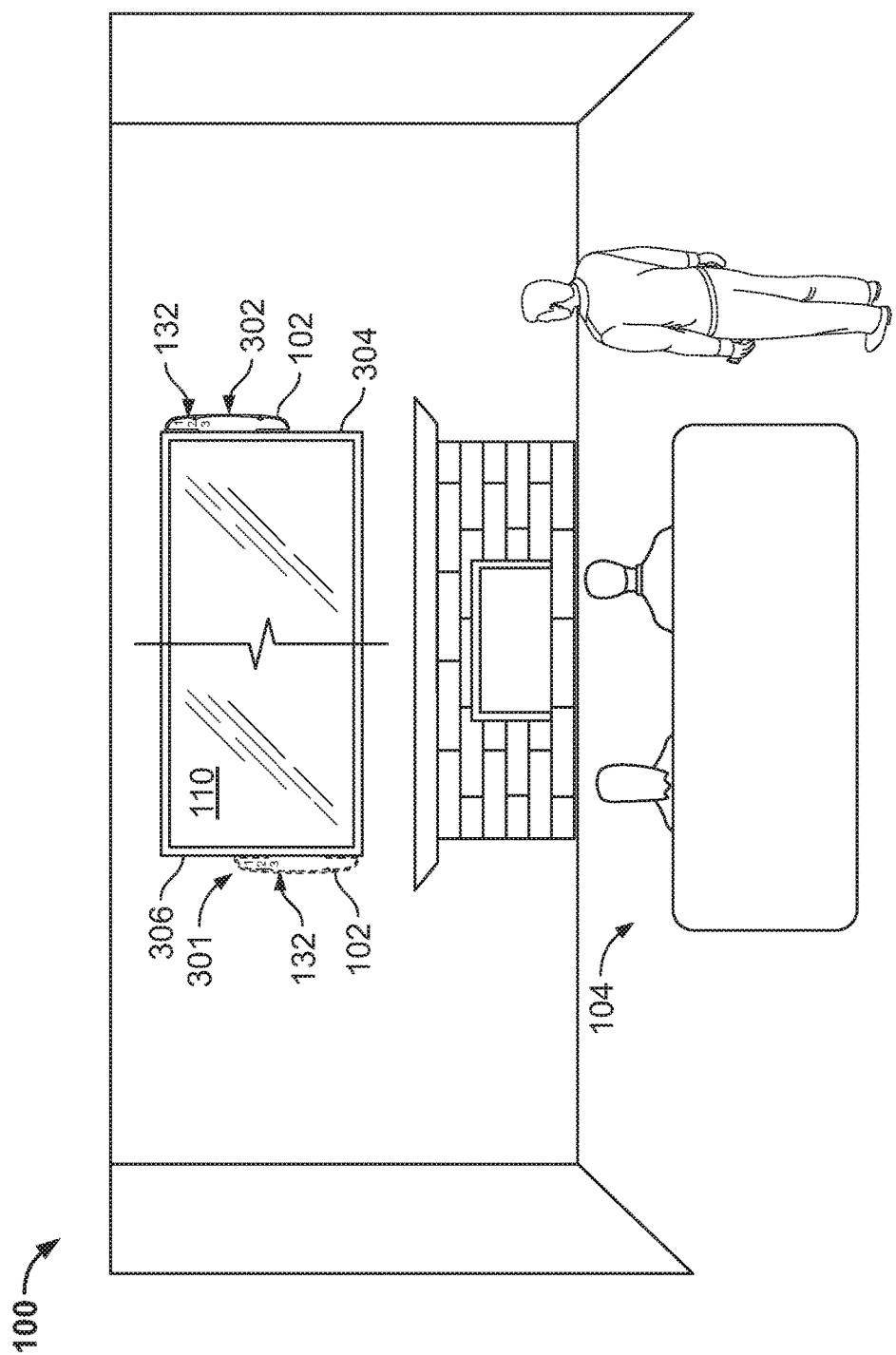
FIG. 3 illustrates the example audience measurement system of FIG. 1 with the example meter in a third mounting orientation or, alternatively, in a fourth mounting orientation.

FIG. 3 illustrates the example media presentation environment 104 of FIG. 1 with the example meter 102 in a third mounting configuration 300 relative to the media device 110. In the third mounting configuration 300, the meter 102 of the illustrated example may be configured for a right-side media device mounting configuration. For example, the meter 102 of the illustrated example may be coupled (e.g. directly attached) to a surface 304 of the media device 110 (e.g., a vertical or right lateral surface in the orientation of FIG. 1). Alternatively, as shown in dashed lines in FIG. 3, the meter 102 of the illustrated example may be provided in a fourth mounting configuration 301 relative to the media device 110. In the fourth mounting configuration 301, the meter 102 of the illustrated example may be configured for a left-side media device mounting configuration. For example, the meter 102 of the illustrated example may be coupled (e.g. directly attached) to a surface 306 of the media device 110 (e.g., a vertical or left lateral surface in the orientation of FIG. 1) opposite the surface 304. In either the third mounting orientation 300 or the fourth mounting orientation 301), the display 132 is in a portrait orientation relative to the media device 110.

Figure 4:
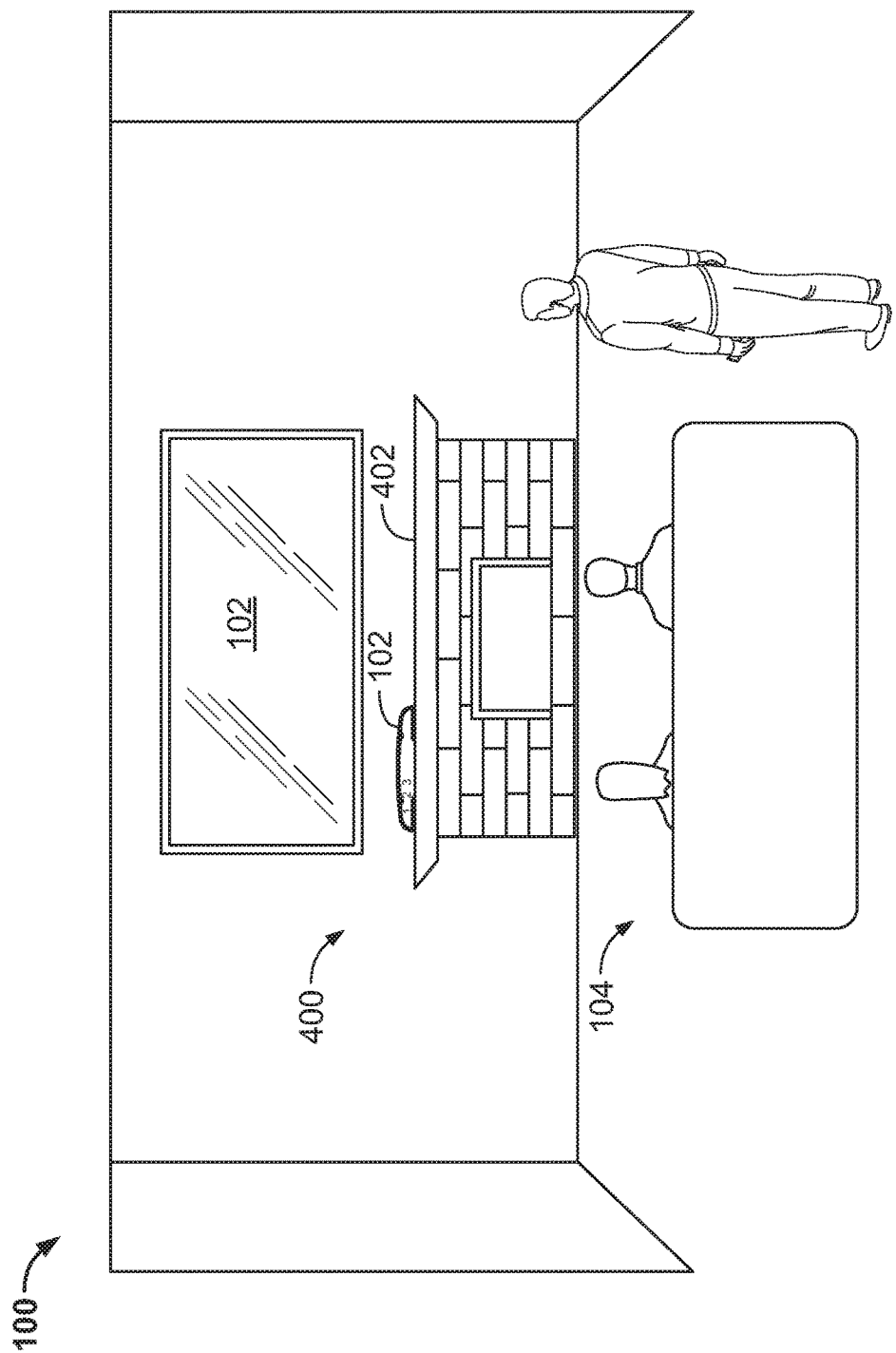
FIG. 4 illustrates the example audience measurement system of FIG. 1 with the example meter in another mounting orientation.

FIG. 4 illustrates the example media presentation environment 104 of FIG. 1 with the meter 102 positioned or spaced from the media device 110. For example, the meter 102 of the illustrated example of FIG. 4 is pleased and/or coupled to (e.g., directly attached to) a surface 402 (e.g., a mantel) of a fireplace positioned near (e.g., below) the media device 110.

Figure 5:
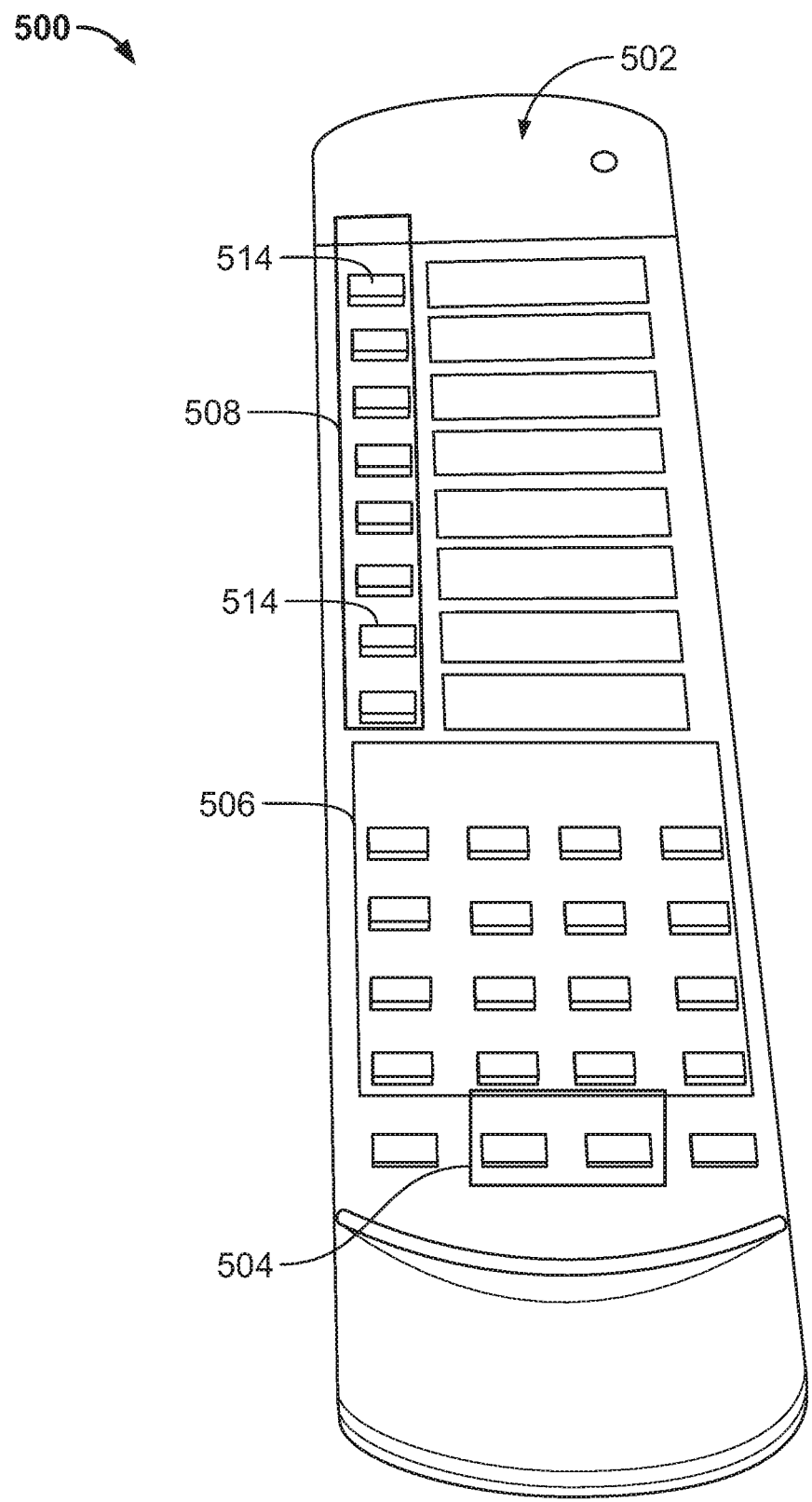
FIG. 5 illustrates an example input device that may be used to interact with the example meter of FIGS. 1-4.

FIG. 5 illustrates an example input device 500 that may be used to implement the input device 122 of FIG. 1. The example input device 500 of the illustrated example includes an example user interface 502 that enables the audience member(s) (e.g., the panelists 106, 107 and 108 of FIG. 1) and/or one or more unregistered users (e.g., a visitor to a panelist household) to input information to the meter 102 of FIG. 1. This information includes registration data to configure the meter 102 and/or demographic data to identify the audience member(s). The user interface 502 includes a keyboard, a touchpad, a touchscreen and/or keypad. In the example of FIG. 5, the user interface 502 is implemented by a key pad that provides an example a gender input interface 504, an example age input interface 506, and an example panelist identification input interface 508. For example, the panelist identification input interface 508 includes a column of identification buttons 514 (e.g., a plurality of numerical or alpha characters), each of which may be assigned to represent a single, different one of the audience members (e.g., the panelists 106, 107 and 108) present in the media presentation environment 104. In some examples, a registered panelist need press only one button on the input device 500 to identify his/her presence in the audience when, for example, the meter 102 of FIG. 1 prompts the audience to self-identify.

Figure 6:
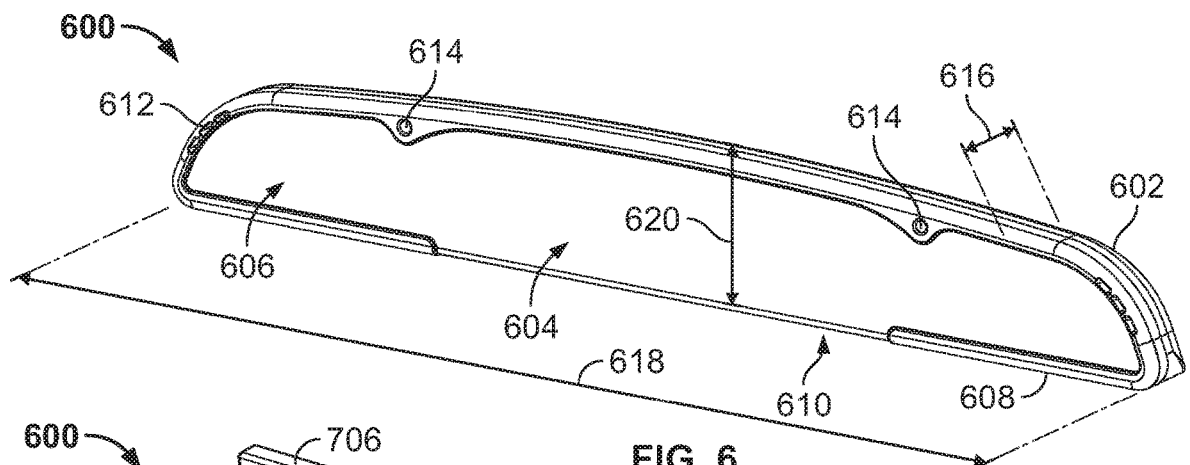
FIG. 6 is a perspective view of another example meter disclosed herein.

FIG. 6 is a perspective, front view of an example meter 600 constructed in accordance with the teachings of this disclosure. The example meter 600 of FIG. 6 may implement the example meter 102 and/or the audience measurement system 100 of FIGS. 1-4. The meter 600 of the illustrated example combines people metering and media metering in a single example housing 602.

To display panelist information, the meter 600 of the illustrated example includes an example display 604. The display 604 of the illustrated example is provided at a front side 606 of the meter 600. To mount or couple the meter to a surface or edge of a media presentation device (e.g., the media device 110 of FIGS. 1-4), the meter 600 of the illustrated example includes a mounting surface 608. The mounting surface 608 of the illustrated example is at a bottom side 610 of the example meter 600. For example, the bottom side 610 of the meter of the illustrated example is substantially perpendicular to the front side 606 of the meter 600. The meter 600 of the illustrated example includes an opening 612 for audio output (e.g., via a speaker) and/or an example opening 614 to receive audio (e.g., via a microphone) generated by a media device (e.g., audio output of the example media device 110 of FIG. 1).

In addition, the meter 600 of the illustrated example provides a relatively low profile or small dimensional footprint (e.g., when mounted to a media presentation device 110). For example, the meter 600 of the illustrated example has a first dimension 616 (e.g., a dimensional thickness), a second dimension 618 (e.g., a dimensional length) and a third dimension 620 (e.g., a dimensional height). For example, the first dimension 616 may be between approximately 5 millimeters (e.g., 0.20 inches) and 50 millimeters (e.g., 2 inches). For example, the first dimension may be approximately 16.5 millimeters (e.g., 0.65 inches). In some examples, the second dimension 618 may be between approximately 200 millimeters (7.2 inches) and 300 millimeters (e.g., 11.8 inches). In some examples, the second dimension 618 may be approximately 265 millimeters (e.g., 10.4 inches). In some examples, the second dimension 618 is a ratio of the first dimension 616. For example, the second dimension 618 to first dimension 616 ratio may be a length-to-width ratio between approximately 5:1 and 15:1. In some examples, the third dimension 620 may be approximately between 10 millimeters (0.4 inches) and 30 millimeters (e.g., 1.2 inches) For example, the third dimension 620 may be approximately 25 millimeters (e.g., 0.98 inches).

Figure 7:
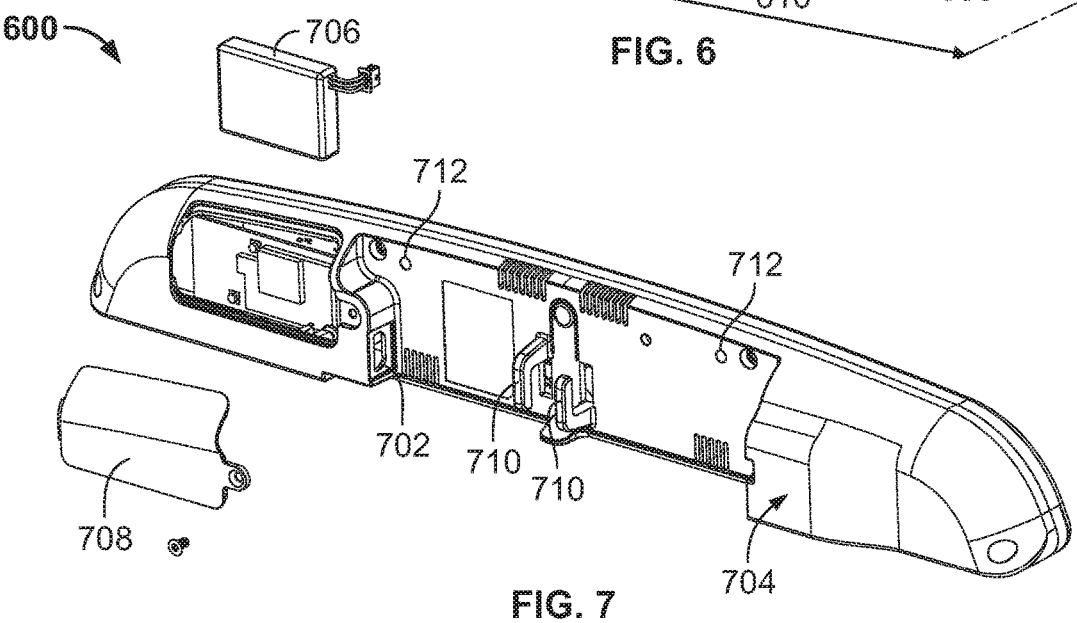
FIG. 7 is a perspective, rear view of the example meter of FIG. 6.

FIG. 7 is a perspective, rear view of the example meter of FIG. 6. The example meter 600 of the illustrated example employs a first example connector 702 accessible via a rear side 704 of the housing 602. The first connector 702 of the illustrated example is a USB connector. However, in some examples, the first connector 702 may be a power connector, a microUSB connector, and/or any other type of connector(s). The first connector 702 of the illustrated example enables communication between, for example, the meter 600 and the media device 110 and/or the gateway 116 of FIGS. 1-4 via a cable (e.g., a USB cable). For example, the meter 600 of the illustrated example may employ invasive monitoring involving a physical connection to the media device 110 via the first connector 702. (e.g., via a USB connection). In some examples, the first connector 702 enables connection between the meter 600 and a power source. In some examples, the power source provides power to the meter 600 and/or a rechargeable battery 706 positioned in the housing 602 and accessible via a removable door 708. In some examples, power to the meter 600 (and/or the battery) may be provided via connection with a media presentation device (e.g., the media device 110). In other words, the meter 600 can communicate with and/or receive power from a media presentation device coupled to the meter 600 via the first connector 702. The housing 602 of the illustrated example employs an example retainer 710 (e.g., hooks) to support, retain and/or otherwise guide a cable coupled to the first connector 702 and/or a second example (described below in connection with FIG. 8). connector 802. In addition, the housing 602 of the illustrated example includes example openings 712 to receive audio (e.g., via a microphone) generated by a media device (e.g., audio output of the example media device 110 of FIG. 1).

Figure 8:
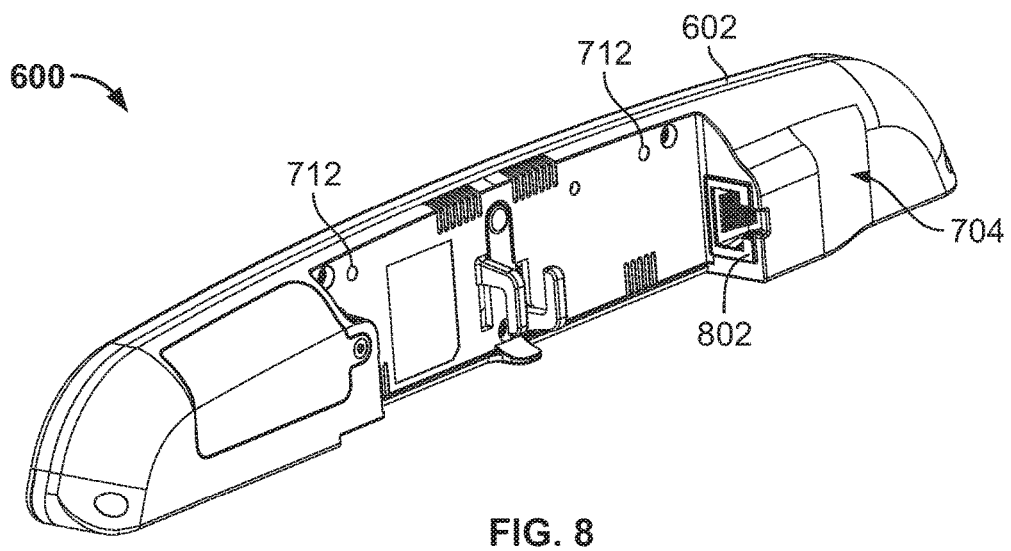
FIG. 8 is another perspective, rear view of the example meter of FIG. 6.

FIG. 8 is another perspective, rear view of the example meter 600 of FIGS. 6-7. The example meter 600 of the illustrated example employs the second example connector 802 accessible via the rear side 704 of the housing 602. The second connector 802 of the illustrated is an Ethernet connector (e.g., RJ45 jack, Cat5e connector, etc.). However, in some examples, the second connector 802 may be a microUSB connector, coaxial cable connector, and/or any other type of connector(s). The second connector 802 of the illustrated example enables communication between, for example, the meter 600 and the media device 110 and/or the gateway 116 of FIG. 1.

Figure 9A:
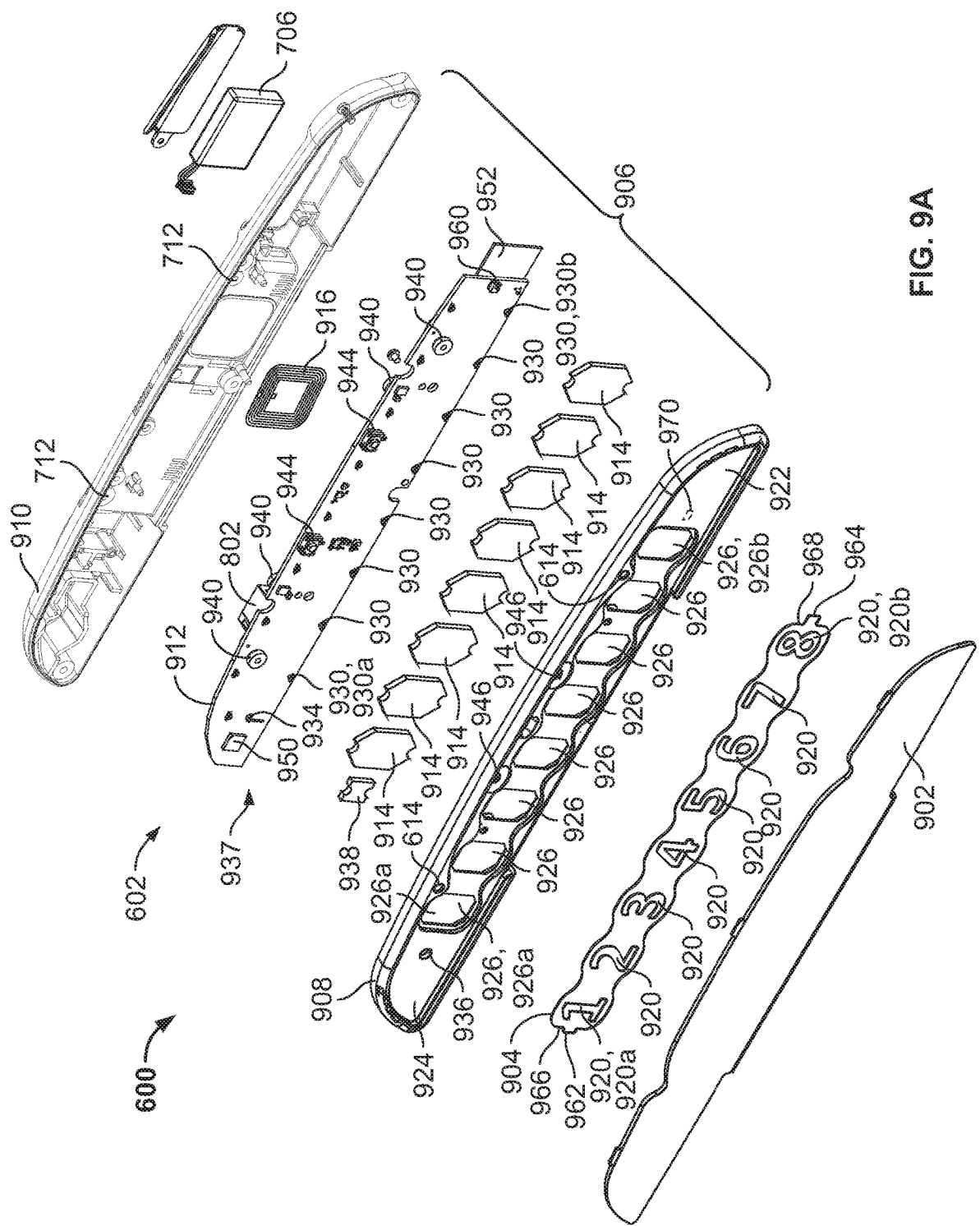
FIGS. 9A and 9B are a perspective, exploded views of the example meter of FIGS. 6-8.
Figure 9B:
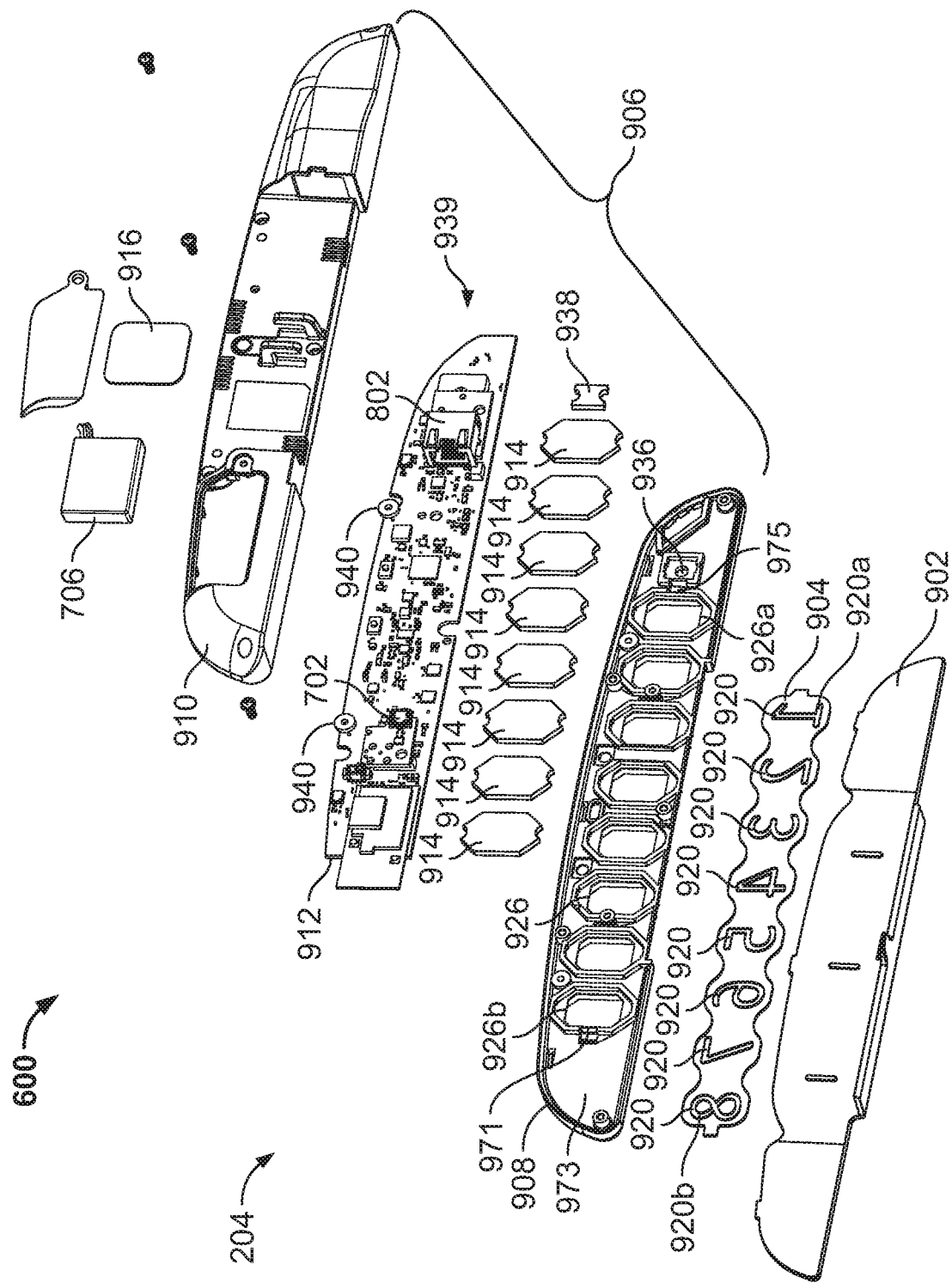

FIG. 9A is a front, exploded view of the example meter 600 of FIGS. 6-8. FIG. 9B is a rear, exploded view of the example meter 600 of FIGS. 6-8. Referring to FIGS. 9A and 9B, the meter 600 of the illustrated example includes an example cover 902, a stencil 904 (e.g., an insert), and example components 906 positioned in the housing 602. To provide the modular display 604, the cover 902 and the stencil 904 are removably coupled to the housing 602.

To house or capture components 906 of the example meter 600, the housing 602 of the illustrated example includes a first example panel 908 (e.g., a front housing portion) coupled to a second example panel 910 (e.g., a rear housing portion). The first panel 908 may be coupled to the second panel 910 via fasteners, snap fit connection, adhesive and/or any other fastening technique(s), fastener(s) and/or connector(s). The components 906 of the example meter 600 may include an example circuit board 912 (e.g. a printed circuit board) having a microprocessor, a plurality of example diffusors 914, an example near-field communication antenna 916, the first and second connectors 702 and 802, the battery 706, a first example antenna 950 (e.g., a WIFI antenna), a second example antenna 952 (e.g., a Bluetooth antenna) and/or other components.

To display identification of a panelist registered with the meter 600, the meter 600 of the illustrated example employs the stencil 904. In particular, the stencil 904 of the illustrated example includes a plurality of example visual indicators 920. For example, each of the visual indicators 920 may be assigned to represent a particular panelist (e.g., the panelists 106, 107 and/or 108 of FIG. 1) associated with a viewing area (e.g., the media presentation environment 104 of FIG. 1)). The visual indicators 920 of the illustrated example are indicia. The visual indicators 920 of the illustrated example are numerals. In addition, the visual indicators 920 of the illustrated example are in ascending order (e.g., from left to right in the orientation of FIG. 7). Further, the visual indicators 920 of the illustrated example are presented in a landscape orientation.

For example, the visual indicators 920 of the illustrated example includes eight single digit characters—one through eight. Thus, the meter 600 of the illustrated example may represent up to eight different panelists. In some examples, the visual indicators 920 may be more than eight or less than eight. In some examples, the visual indicators 920 or indicia may include text and/or alphanumeric characters. In some examples, the visual indicators 920 or indicia may include symbols, other language characters (e.g., Chinese characters or other logograms) and/or any other indicia associated with, or used to identify, a panelist.

To receive the stencil 904, the housing 602 of the illustrated example includes an example display area 922. More specifically, the display area 922 of the illustrated example is provided by a front surface 924 of the first panel 908. The display area 922 of the housing 602 of the illustrated example includes a plurality of example openings 926. In particular, a respective one of the openings 926 is associated with (e.g., aligned with) a respective one of the visual indicators 920. For example, a first visual indicator 920*a* (e.g., a first numeral or indicia) of the stencil 904 is aligned with a first opening 926*a*, a second visual indicator 920*b* (e.g., a second numeral or indicia) of the stencil 904 is aligned with a second opening 926*b* different from the first opening 926*a*, and so on. In the illustrated example, the housing 602 includes eight openings 926 associated with respective ones of the eight visual indicators 920 of the stencil 904.

Each of the openings 926 is in communication with a light source such as, for example, a light emitting diode that emits light when energized. The light source of the illustrated example includes a plurality of example lights 930 (e.g., light emitting diodes) that are surface mounted to the circuit board 912. A respective one of the lights 930 is aligned with or provides illumination to a respective one of the openings 926 to illuminate a respective one of the visual indicators 920. The circuit board 912 of the illustrated example includes eight lights 930. For example, a first light 930*a* from the plurality of lights 930 illuminates the first visual indicator 920*a* from the plurality of visual indicators 920 via the first opening 926a, a second light 930b from the plurality of lights 930 illuminates the second visual indicator 920b from the plurality of visual indicators 920 via the second opening 926b, and so on. In this manner, a respective one of the lights 930 may illuminate a respective one of the visual indicators 920 of the stencil 904 aligned or associated with the respective one of the openings 926 in communication with the respective one of the lights 930.

To provide status information, the meter 600 of the illustrated example includes an example status indicator 932. For example, the status information may provide indication that the meter 600 is powered, the battery 706 has a low charge and/or any other indication. The status indicator 932 of the illustrated example is an example light 934 (e.g., a light emitting diode) mounted to the circuit board 912 and visible via the display area 922 via an example opening 936 through the first panel 908.

The lights 930 and/or 934 may provide a clear (e.g., white) light, one or more colored lights (e.g., a green light, a red light, etc.), or any combination thereof. In some examples, an intensity of the lights 930 and/or 934 may vary (e.g., increase and/or decrease) when the meter 600 prompts a panelist to self-identify. For example, the meter 600 may cause the first light 930a to turn on and off rapidly to present the first visual indicator 920a in flashing or blinking pattern for duration of time (e.g., 20 seconds) or until a panelist self-identifies.

To evenly distribute or scatter light emitted by the lights 930 through the openings 926, the meter 600 of the illustrated example includes the diffusors 914. In addition, the meter 600 of the illustrated example includes a diffusor 938 may be provided to evenly distribute the light through the example opening 936.

To receive audio signals, the example meter 600 of the illustrated example includes a plurality of example audio sensors 940 (e.g., a microphone and/or other acoustic sensors). The audio sensors 940 of the illustrated example are positioned on a first side 937 of the circuit board 912 (e.g., the front side) and on a second side 939 of the circuit board 912 (e.g., the rear side) opposite the first side. The audio receives 940 are aligned with respective openings 614 through the first panel 908 and the respective openings 712 of the second panel 910. The audio sensors 940 of the illustrated example enable optimal sound detection (e.g., sound pickup) for speaker outputs of the media device 110 (e.g., from speakers of a television), which typically emanate from a rear of the media device 110 (e.g., a rear of the television), and sound output from, for example, surround sound speakers that typically emanate in a media presentation environment (e.g., the media presentation environment 104) in the front of the media device 110 (e.g., a front of the television). The dual audio sensors 940 on both the front side 937 and the rear side 939 of the example circuit board 912 reduce instances of audio nulls adversely impacting watermark performance.

To receive commands and/or communicate with an input device (e.g., the input device 122 of FIG. 1 or the input device 500 of FIG. 5), the meter 600 of the illustrated example includes example infrared sensors 944. The infrared sensors 944 of the illustrated example are aligned with respective example openings 946 of the first panel 908.

In some examples, the meter 600 determines if the housing 602 is in an improper mounting configuration or orientation (e.g., an orientation other than the first mounting orientation 134 of FIG. 1, the second mounting orientation 200 of FIG. 2, the third mounting orientation 300 of FIG. 3, and the fourth mounting orientation 400 of FIG. 4). To detect or verify proper orientation of the meter 600 and/or the housing 602 relative to a desired mounting configuration (e.g., the first mounting orientation 134 of FIG. 1, the second mounting orientation 200 of FIG. 2, the third mounting orientation 300 or the fourth mounting orientation 301 of FIG. 3), the meter 600 of the illustrated example employs an example sensor 961 (FIG. 9B). For example, the sensor 961 of the illustrated example is an accelerometer to sense an orientation of the meter 600 and/or the housing 602. In some examples, the sensor 961 may be a piezoelectric sensor, a strain gauge sensor, and/or any other sensor to detect an orientation of the meter 600 and/or the housing 602.

In some examples, the meter 600 detects the housing orientation to determine if the housing 602 becomes dislodged or disconnected from the media device (e.g., the media device 110). For example, the meter 600 may determine if the housing may have fallen behind a television and/or from a mounting surface (e.g., the mounting surface 136) if the detected orientation via the sensor 961 is not the first mounting orientation 134 of FIG. 1, the second mounting orientation of FIG. 2, the third mounting orientations 300 of FIG. 3, or the fourth mounting orientation 301 of FIG. 3. In some examples, the meter 600 of the illustrated example is configured to provide an alarm (e.g., a visual alarm via the display area 922 and/or an audible warning via a speaker) if the detected orientation is not a proper orientation (e.g., the detected orientation is not the first mounting orientation 134 of FIG. 1, the second mounting orientation of FIG. 2, the third mounting orientations 300, or the fourth mounting orientation 301 of FIG. 3).

In some examples, the example meter 600 may control operation of the lights 930 based on a detected mounting orientation of the meter 600 and/or the housing 602. For example, the meter 600 may control a particular light 930 associated with a particular visual indicator 920 of the stencil 904 based on the detected orientation of the housing 602. For example, when the example meter 600 is in a first orientation (e.g., the first mounting orientation 134 of FIG. 1 or the third mounting orientation 300 of FIG. 3), the first light 930a is associated with the first visual indicator 920a of the stencil 904 and the second light 930b is associated with the second visual indicator 920b of the stencil 904. However, when the example meter 600 is in a second orientation (e.g., the second mounting orientation 200 of FIG. 2 or the fourth mounting orientation 301 of FIG. 3) (e.g., an inverted orientation)), the first light 930a is associated with the second visual indicator 920b of the stencil 904 and the second light 930b is associated with the first visual indicator 920a of the stencil 904 (i.e., the assignment or orientation of the lights 930 with the respective ones of the visual indicators 920 is flipped). Thus, the meter 600 may automatically assign the lights 930 with the respective one of the visual indicators 920 of the stencil 904 based on the orientation of the meter 600 and/or the housing 602.

In some examples, based on the detected orientation of the housing 602, the meter 600 may verify that the stencil 904 is in a proper orientation relative to the housing 602. For example, the stencil 904 may be properly oriented relative to the housing 602 when the visual indicators 920 are in oriented in an upright orientation or right-side up position. For example, the stencil 904 may need to be inverted when the housing 602 is positioned from the first orientation (e.g., first mounting orientation 134 of FIG. 1) to a second orientation (e.g., the second mounting orientation 200 of FIG. 2). For example, the meter 600 of the illustrated example verifies proper stencil orientation relative to the display area 922 based on the mounting orientation of the meter 600 and/or the housing 602.

To detect an orientation or position of the stencil 904 relative to the display area 922, the meter 600 of the illustrated example includes an example sensor 960 (e.g., a contact switch). To enable orientation detection of the stencil 904 via the sensor 960, the stencil 904 of the illustrated example includes a first example tab 962 and a second example tab 964. In the illustrated example, the first tab 962 and the second tab 964 are asymmetric tabs protruding from respective lateral edges 966 and 968 of the stencil 904. The first tab 962 has a first dimension (e.g., a first length) and the second tab 964 has a second dimension (e.g., a second length) that is greater than the first dimension. To enable the sensor 960 to detect the presence or absence of the first tab 962 or the second tab 964 of the stencil 904, the first panel 908 of the illustrated example includes an example sensing slot 970 (e.g., a recessed cavity, a channel, etc.). The sensing slot 970 may include a contact electrically coupled to the sensor 960.

Referring to FIG. 9B, the sensing slot 970 of the illustrated example is an example recessed channel 971 formed on an inner surface 973 of the first panel 908 opposite the display area 922. Thus, the sensing slot 970 of the illustrated example does not extend through the front surface 924 of the display area 922. The sensing slot 970 of the illustrated example is sized to receive the first tab 962 and the second tab 964. However, the sensor 960 only detects the presence of the second tab 964 (e.g., due to the asymmetric dimensions of the first tab 962 and the second tab 964) when the first tab 962 and the second tab 964 are positioned in the sensing slot 970. For example, a contact may be positioned in the sensing slot 970 that may be triggered only by the second tab 964 positioned in the sensing slot 970. The first panel 908 of the illustrated example includes an example slot 975 on a opposite end of the sensing slot 970 to receive the first tab 962 or the second tab 964 when the other one of the first tab 962 or the second tab 964 is positioned in the sensing slot 970.

In some examples, the example meter 600 may control operation of the lights 930 based on a detected orientation of the stencil 904. In some such examples, the example meter 600 may control operation of the lights 930 without detecting an orientation of the housing 602. In some examples, the meter 600 may control a particular light 930 associated with a particular visual indicator 920 of the stencil 904 based on the detected orientation of the stencil 904. For example, when the example meter 600 detects that the sensor 960 is in a triggered or active state or condition (e.g., the second tab 964 is positioned in the sensing slot 970 when the the stencil 904 is in the first orientation), the first light 930a is associated with the first visual indicator 920a of the stencil 904 and the second light 930b is associated with the second visual indicator 920b of the stencil 904. However, when the meter 600 detects that the sensor 960 is in a non-triggered or non-active state or condition (e.g., when the stencil 904 is in a second orientation (e.g., an inverted orientation) and the second tab 964 is in the slot 975), the first light 930a is associated with the second visual indicator 920b of the stencil 904 and the second light 930b is associated with the first visual indicator 920a of the stencil 904 (i.e., the assignment or orientation of the lights 930 with the respective ones of the visual indicators 920 is flipped). Thus, the meter 600 may automatically assign the lights 930 with the respective one of the visual indicators 920 of the stencil 904 based on a detected orientation of the stencil 904.

Figure 10A:
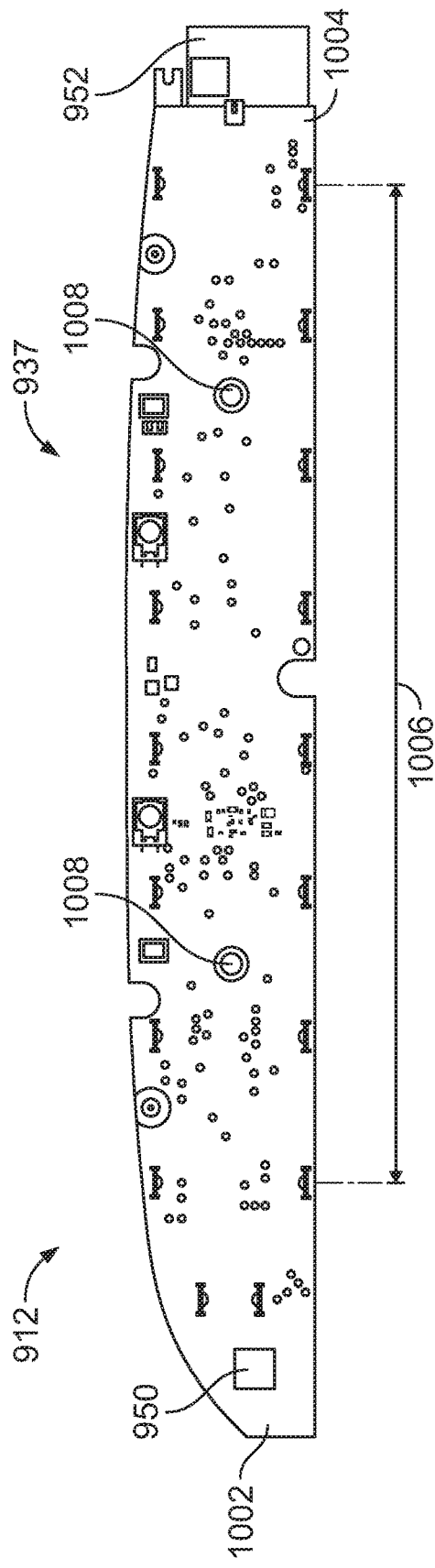
FIG. 10A is a front view of an example circuit board of the example meter of FIGS. 6-8.
Figure 10B:
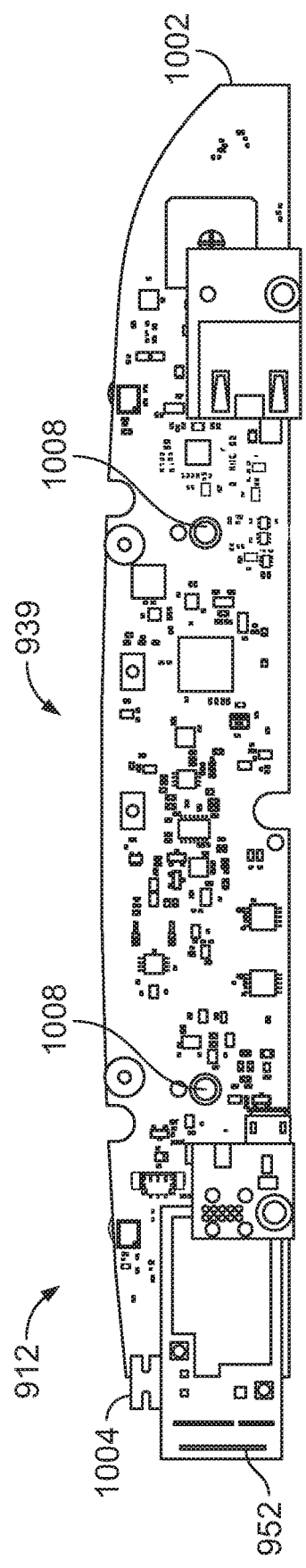
FIG. 10B is a rear view of the example circuit board of the example meter of FIGS. 6-8.

FIG. 10A is a front view of the example circuit board 912 of FIGS. 9A and 9B. FIG. 10B is a rear view of the example circuit board 912 of FIG. 10A. Referring to FIGS. 9A and 9B, to prevent or reduce interference (e.g., electromagnetic interference) between the first antenna 950 and the second antenna 952, the first antenna 950 of the illustrated example is positioned on the first side 937 (e.g., a front surface) of the circuit board 912 and the second antenna 952 is positioned on the second side 939 (e.g., a rear surface) of the circuit board 912 opposite the first side 937. In addition, the first antenna 950 of the illustrated example is positioned near (e.g., substantially adjacent) a first side edge 1002 of the circuit board 912 and the second antenna 952 is positioned near (e.g., substantially adjacent) a second side edge 1004 of the circuit board 912. For example, the first antenna 950 and the second antenna 952 of the illustrated example are spaced by a distance that is at least equal to or greater than a distance 1006 between the first light 920a and the second light 920b. In addition, the circuit board 912 includes example guide pin openings 1008 to receive guide pins of the second panel 910.

Figure 11:
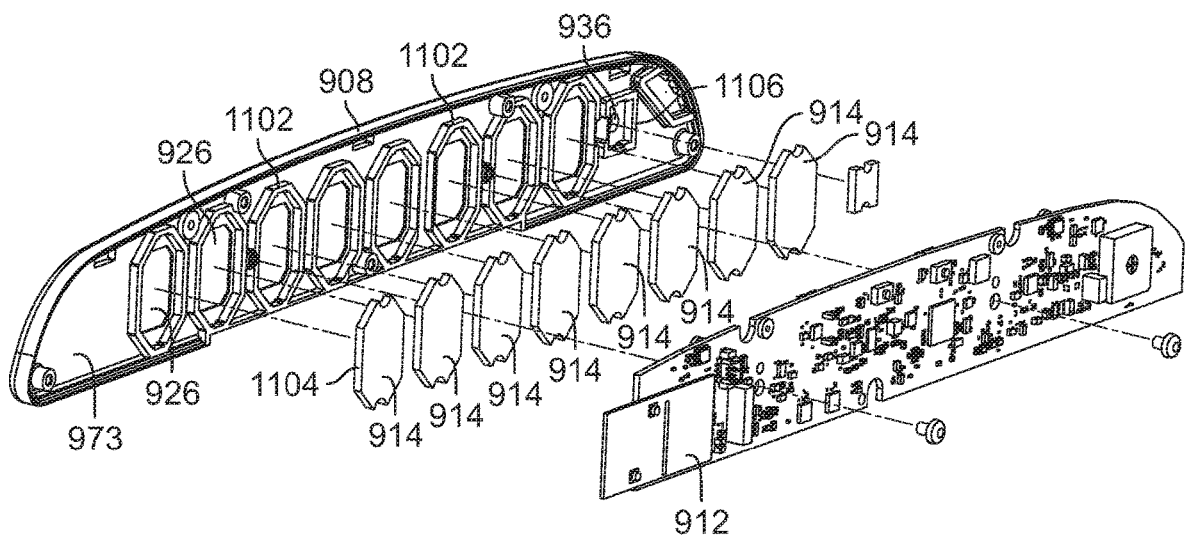
FIG. 11 is an exploded view of a portion of the example meter of FIGS. 6-8.

FIG. 11 is a partially assembled view of the example meter 600. To assemble the example meter 600, a respective one of the diffusors 914 is positioned or aligned with a respective one of the openings 926. To prevent the diffusors from dislodging or shifting relative to respective openings 926 and/or the first panel 908 after the housing 602 is assembled, respective example perimeter walls 1102 are positioned adjacent respective ones of the openings 926. Each perimeter wall 1102 of the illustrated example includes a profile or shape that is substantially similar to a profile or shape of a perimeter 1104 of the diffusors 914. The perimeter wall 1102 adjacent each of the openings 926 of the illustrated example retains a respective one of the diffusors 914 aligned with the respective one of the openings 926. Likewise, the opening 936 of the illustrated example includes a perimeter wall 1106 to retain the diffusor 938. With the diffusors 914 and 938 positioned in the respective openings 926 and 936, the circuit board 912 of the illustrated example is attached to the first panel 908 (e.g., via fasteners). For example, the front side 937 of the circuit board 912 is oriented toward the inner surface 973 of the first panel 908.

Alternatively, in some examples, the stencil 904 is not provided. In some such examples, the indicia (e.g., the numerals) are provided or printed on the diffusors 914. For example, a respective one of the visual indicators 920 may be printed on a respective one of the diffusors 914. In some such examples, the diffusors 914 are removably coupled to the respective openings 920. In other words, the diffusors 914 may be accessible via the display area 922 when the cover 902 is removed from the housing 602. In some examples, the diffusors 914 are removably coupled to the respective openings 920 via, for example, a snap-fit connection. For example, the perimeter wall 1106 may be formed on the front surface 924 of the display area 922 such that the diffusors 914 are accessible via the display area 922 when the housing 602 is in an assembled state (e.g., when the first panel 908 and the second panel 910 are coupled together). In some examples, the diffusors 914 may be coupled together or interconnected as a unitary structure or frame. In some such examples, the frame may be removably coupled to the housing 602 and/or the display area 922 to couple the diffusors 914 to the display area 922. In some examples, the meter 600 may employ one or more sensor to determine the orientation of the diffusors 914 relative to the orientation of the housing 602. For example, the meter 600 may be configured to determine if the orientation of the diffusors (e.g., the indicia printed on the diffusors) relative to the orientation of the housing 602 is valid. Alternatively, in some examples, the indicia are provided on the cover 902.

Figure 12:
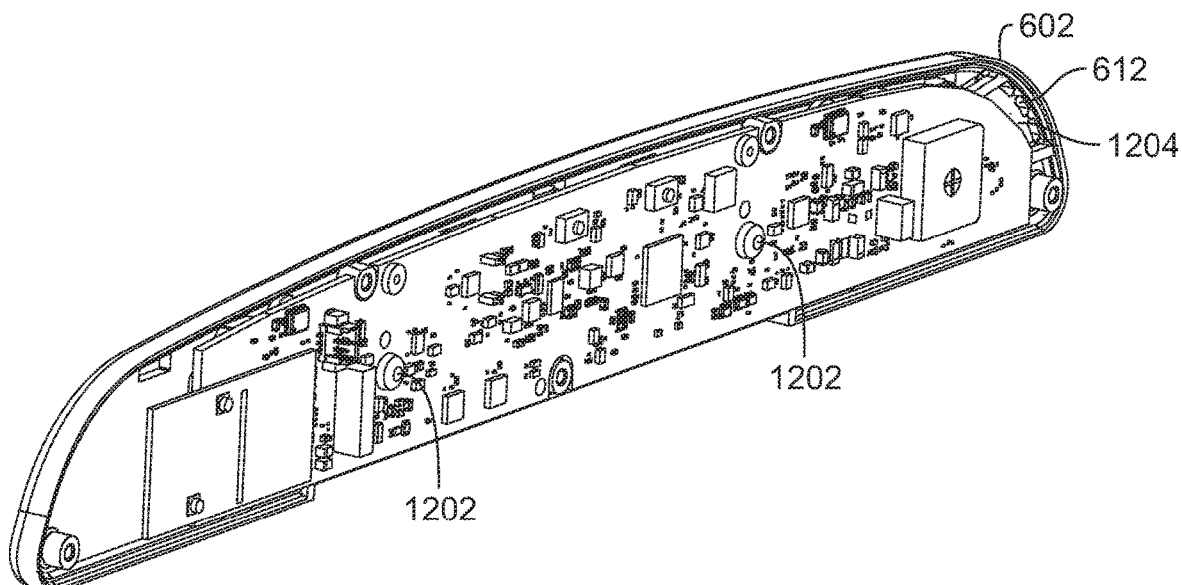
FIG. 12 is a partial assembled view of the portion of the example meter shown in FIG. 11.

FIG. 12 illustrates the circuit board 912 and the diffusors 914 and 938 of the illustrated example coupled to the first panel 908. For example, the circuit board 912 of the illustrated example is coupled to the inner surface 973 of the first panel 908 via fasteners 1202. To emit sound such as, for example, an alarm provided by a speaker of the circuit board 912, the example housing 602 of the illustrated example includes an example speaker chamber 1204. The speaker chamber 1204 of the illustrated example is formed in the first panel 908 and is in communication with the openings 612.

Figure 13:
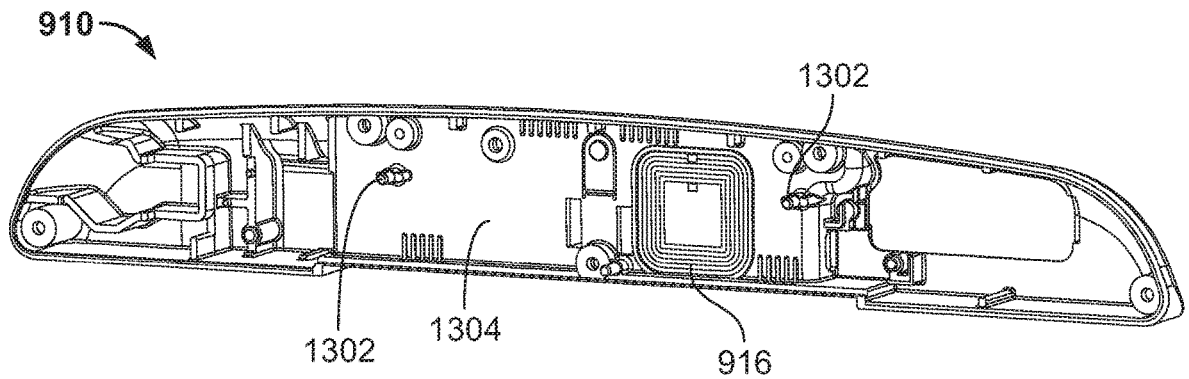
FIG. 13 is a perspective view of a rear panel of the example meter of FIGS. 6-8.

FIG. 13 illustrates a perspective view of the example second panel 910 of the illustrated example. To facilitate alignment and/or assembly (e.g., attachment) of the second panel 910 and the first panel 908, the second panel 910 of the illustrated example includes a plurality of example guide pins 1302. The guide pins 1302 of the illustrated example project from an inner surface 1304 of the second panel 910. In the illustrated example, the antenna 916 (the near field communication antenna) is attached to the inner surface 1304 of the second panel 910.

Figure 14:
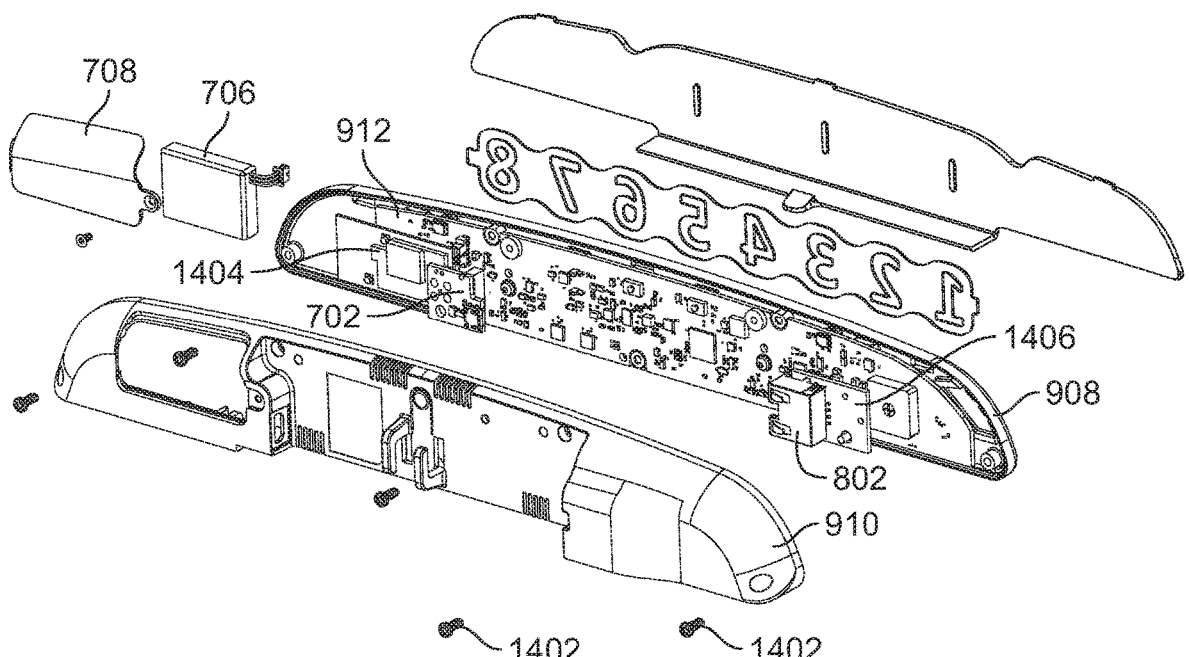
FIG. 14. is a partially assembled view of the example meter of FIGS. 6-8.

FIG. 14 illustrates another partial assembled, perspective view of the example meter 600. To assemble the housing 602 of the illustrated example, the second panel 910 of the illustrated example is attached to the first panel 908 via a plurality of example fasteners 1402. The battery 706 of the illustrated example is removably positioned in the housing 602 and the door 708 is attached to the housing 602. In the illustrated example, the first connector 702 and the second connector 802 are coupled or attached to the circuit board 912. However, in some examples, the first connector 702 and/or the second connector 802 may be coupled to the second panel 910 prior to connection with the circuit board 912. For example, example daughter boards 1404 and 1406 including the respective first and second connectors 702 and 802 may be coupled or attached to the inner surface 1304 of the second panel 910. In some such examples, the first and second connectors 702 and 802 are commutatively coupled the circuit board when the second panel 910 is coupled to the first panel 908. In some such examples, the guide pins 1302 align the daughter board connections of the example first and second connectors 702 and 802 with respective connectors of the circuit board 912.

Figure 15:
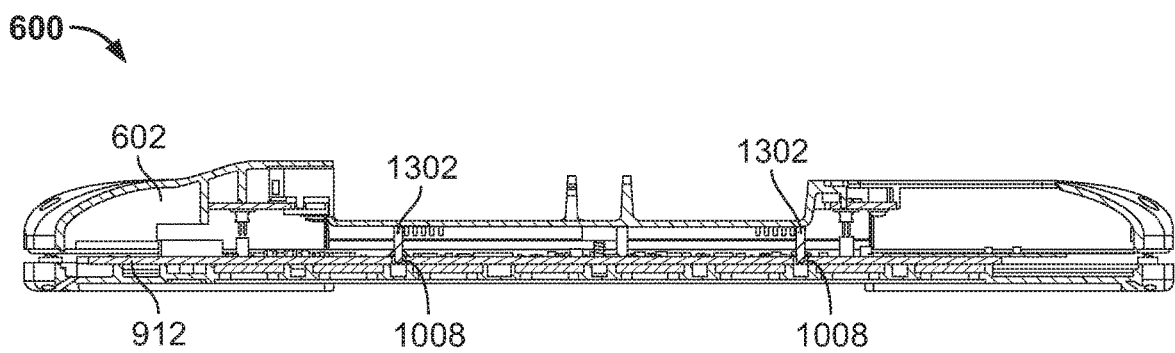
FIG. 15 is a cross-sectional, plan view of the example meter of FIGS. 6-8.

FIG. 15 is a cross-sectional view of the example meter 600. As shown in FIG. 15, the guide pins 1302 of the second panel 910 of the illustrated example engage or pass through the guide pin openings 1008 of the circuit board 912 to align the circuit board 912 relative to the housing 602.

Figure 16A:
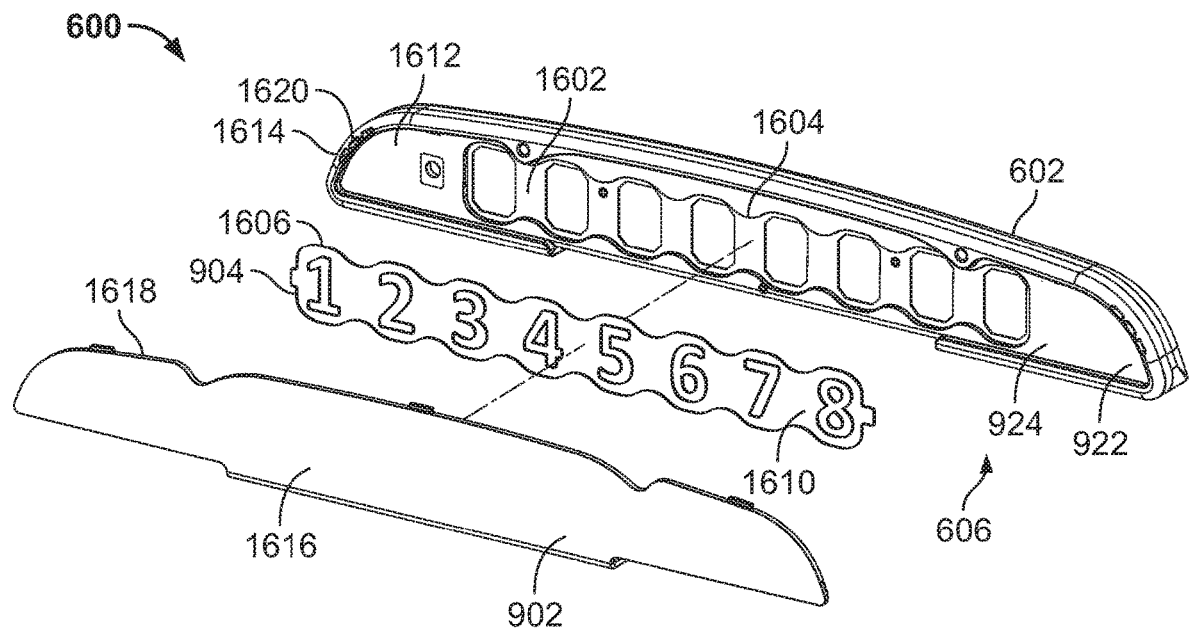
FIG. 16A is a partial assembled perspective view of the example meter of FIGS. 6-8.
Figure 16B:
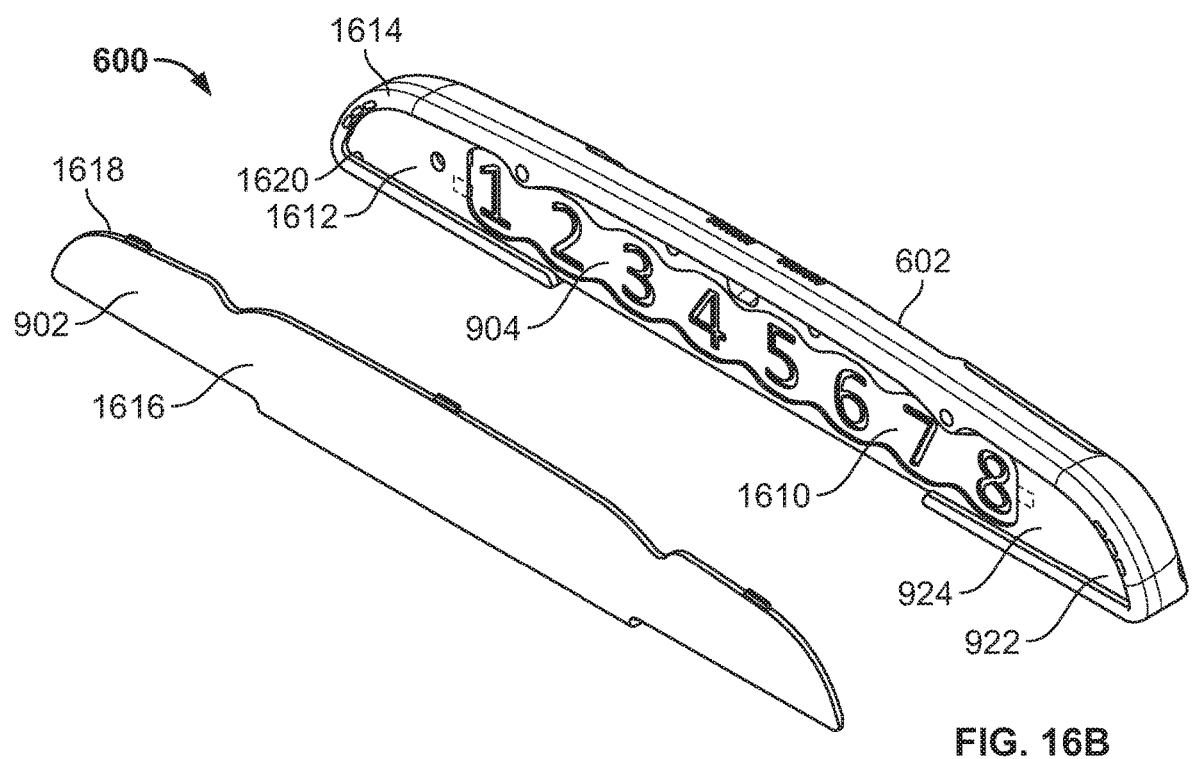
FIG. 16B is another partial assembled perspective view of the example meter of FIGS. 6-8.

FIG. 16A is a perspective view of the example meter 600 showing the stencil 904 and the example cover 902 of the illustrated example removed from the housing 602. FIG. 16B is a perspective view of the example meter 600 showing the cover 902 of the illustrated example removed from the housing 602 and the stencil 904 of the illustrated example coupled to the housing 602.

Referring to FIGS. 16A and 16B, to receive the stencil 904 of the illustrated example, the display area 922 of the housing 602 includes a first example recessed cavity 1602. For example, the first recessed cavity 1602 of the illustrated example has a perimeter or outline 1604 (e.g., a sinusoidal pattern perimeter) that is substantially similar to a perimeter or outline 1606 (e.g., a sinusoidal pattern perimeter) of the stencil 904. To this end, the first recessed cavity 1602 of the housing 602 of the illustrated example matably receives the stencil 904. For example, when mounted or coupled to the housing 602, a front surface 1610 of the stencil 904 of the illustrated example may be flush mounted relative to the front surface 924 of the display area 922.

To receive the cover 902, the display area 922 of the housing 602 of the illustrated example includes a second example recessed cavity 1612. The second recessed cavity 1612 of the illustrated example is adjacent the first recessed cavity 1602. For example, the second recessed cavity 1612 defines the front surface 924 of the display area 922. In addition, the second recessed cavity 1612 of the illustrated example defines a peripheral lip 1614 (e.g., an edge) of the front side 606 of the housing 602. To this end, an outer surface 1616 (e.g., a front surface) of the cover 902 of the illustrated example is substantially flush mounted relative to the peripheral lip 1614 of the housing 602. In addition, a perimeter 1618 of the cover 902 of the illustrated example is substantially similar to a perimeter 1620 of the peripheral lip 1614. To this end, the cover 902 matably engages the display area 922 of the housing 602.

Figure 17A:
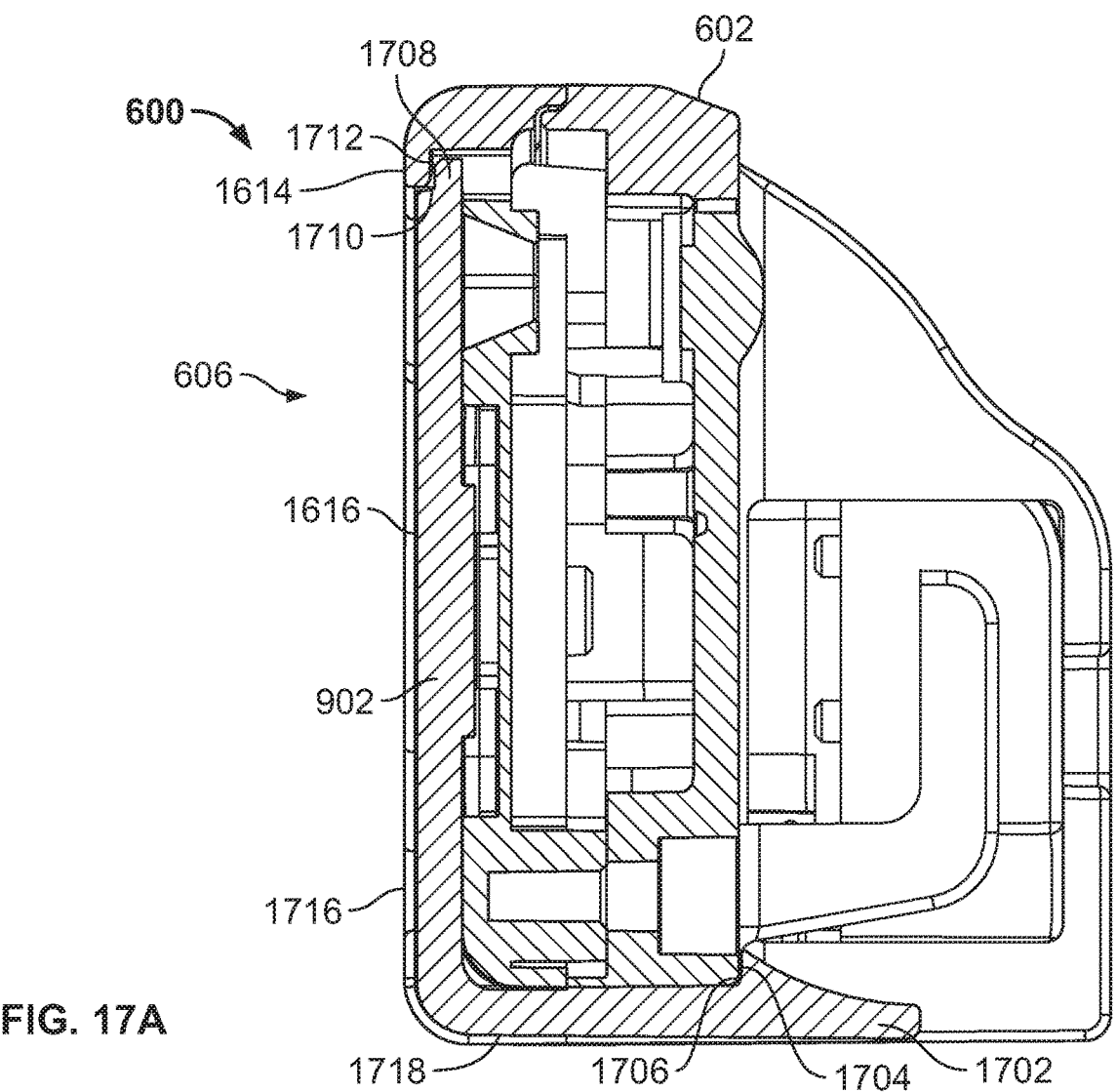
FIG. 17A is a cross-sectional side view of the example meter of FIGS. 6-8.
Figure 17B:
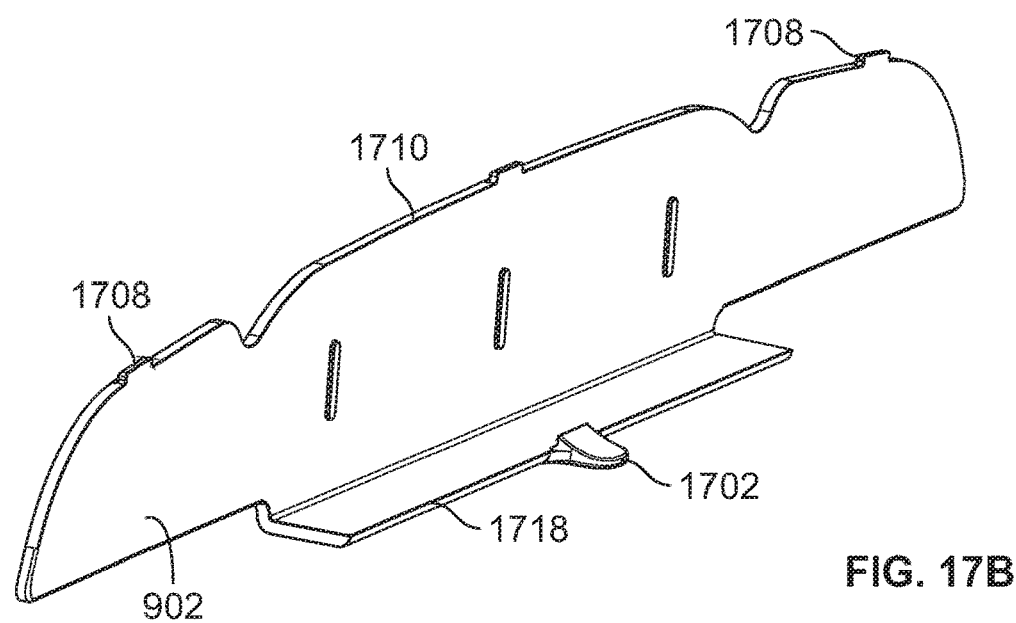
FIG. 17B is a perspective view of an example cover of the example meter of FIGS. 6-8.

FIG. 17A is a cross-sectional view of the example meter 600 of FIG. 6. FIG. 17B is a perspective view of the example cover 902. Referring to FIGS. 17A and 17B, the cover 902 of the illustrated example is removably coupled to the housing 602 via a snap-fit connection. For example, the cover 902 can be removed from the housing 602 without use of a tool. To removably couple the cover 902 to the housing 602, the cover 902 of the illustrated example includes an example clip 1702. The clip 1702 of the illustrated example defines an engagement surface 1704 that engages (e.g., frictionally engages) a retaining surface 1706 of the housing 602. The clip 1702 of the illustrated example flexes or bends to engage or disengage the retaining surface 1706 of the housing 602. The cover 902 of the illustrated example includes a plurality of example raised ends or lips 1708 protruding from an upper edge 1710 of the cover 902. The lip 1708 engages or contacts (e.g., frictionally engages) a retaining surface 1712 of the housing 602 (e.g., the peripheral lip 1614 of the first panel 908). Thus, when the cover 902 is coupled to the housing 602, the cover 902 of the illustrated example is retained to the housing 602 via the snap fit connection (e.g., friction engagement between the clip 1702 and the retaining surface 1706). To couple the cover 902 of the illustrated example to the housing 602, the lips 1708 are positioned in engagement with the retaining surface 1712 and the cover 902 is rotated so that the engagement surface 1704 frictionally engages the retaining surface 1706.

In addition, when the cover 902 of the illustrated example is coupled to the housing 602, the outer surface 1616 of the cover 902 of the illustrated example is substantially flush or slightly recessed (e.g., by approximately between 0.1 inches and 0.3 inches, etc.) relative to an outermost surface 1716 of the front side 606 of the housing 602 (e.g., the peripheral lip 1114). In addition, a portion 1718 of the cover 902 of the illustrated example is positioned (e.g., wraps) underneath the housing 602. The cover 902 of the illustrated example is composed of a semi-translucent material to allow visual presentation of only the illuminated visual indicators 920. In some examples, the cover 902 may be transparent.

Figure 18:
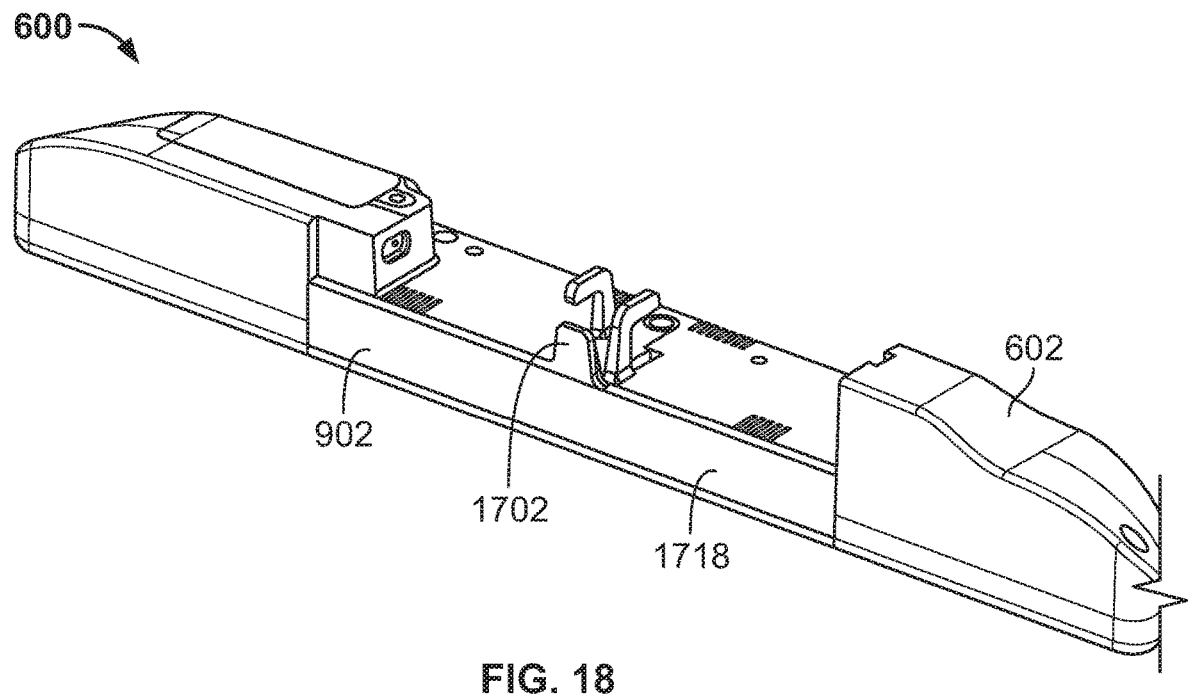
FIG. 18 is a perspective, bottom view of the example meter of FIGS. 6-8.

FIG. 18 is perspective view of the example meter 600. To remove the cover 902 from the housing 602, the clip 1702 of the illustrated example may be depressed or pushed away from the housing 602 (e.g., via a user's finger).

Figure 19:
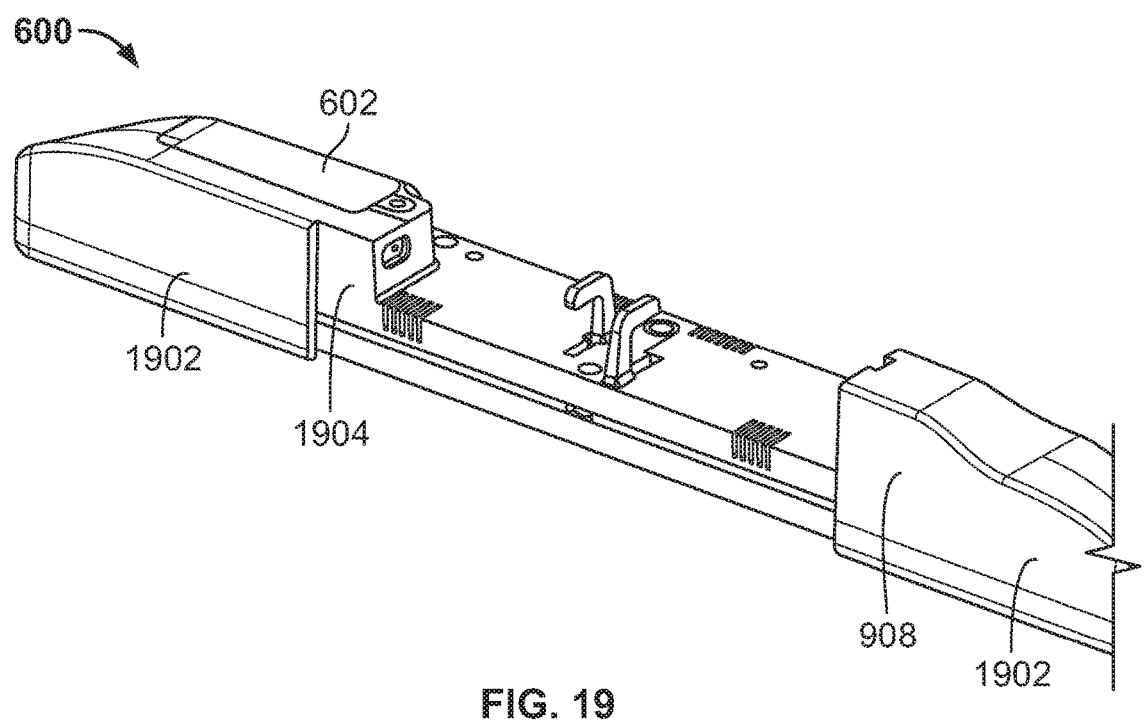
FIG. 19 is a perspective, bottom view of the example meter of FIGS. 6-8 showing a cover of the example meter removed from a housing of the example meter.

FIG. 19 is a perspective view of the example meter 600 with the cover 902 removed. Removing the cover 902 of the illustrated example enables access to the stencil 904 and the display area 922.

In the illustrated example of FIG. 19, the mounting surface 608 of the example meter 600 includes one or more mounting surfaces or mounting areas 1902 to mount the meter 600 to a media presentation device (e.g., the media device 110 of FIG. 1). The mounting areas 1902 receive, for example, adhesive (e.g., an adhesive strip) to attach or mount the meter 600 to the media presentation device. To receive the portion 1718 of the cover 902, the mounting surface 608 of the illustrated example includes a recessed portion or recessed area 1904. The recessed area 1904 of the illustrated example is positioned between the mounting areas 1902. In this manner, the portion 1718 of the cover 902 is substantially flush or recessed relative to the mounting areas 1902 and/or the mounting surface 608.

FIG. 20 illustrates the example meter 600 in a first mounting orientation 2000 (e.g., an above-television mounting configuration). In the illustrated example of FIG. 20, the cover 902 and the stencil 904 of the illustrated example are removed from the housing 602 for illustrative purposes. In the first mounting orientation 2000, the housing 602 is oriented in a first orientation 2002 and the stencil 904 is oriented in a first direction 2004 (e.g., an upright orientation). For example, when the housing 602 is in the first orientation 2002, the mounting surface 608 of the housing 602 is oriented in a downward direction in the orientation of FIG. 20. When one or more of the lights 930 illuminate the respective one or more visual indicators 920, the illuminated visual indicators 920 are presented in an upright orientation.

In some examples, the meter 600 of the illustrated example detects a proper orientation of the stencil 904 based on the orientation of the housing 602. For example, when the housing 602 is in the first orientation 2002 and the second tab 964 is sensed by the sensor 960 (e.g., the second tab 964 is positioned in the sensing slot 970 (FIGS. 9A and 9B)), the meter 600 of the illustrated example determines that the stencil 904 is properly oriented relative to the display area 922 and/or the orientation of the housing 602. On the contrary, for example, if the housing 602 is in the first orientation 2002 and the second tab 964 is not sensed by the sensor 960 (i.e., the first tab 962 is positioned in the sensing slot 970), the meter 600 determines that the stencil 904 is improperly oriented relative to the display area 922 and/or the orientation of the housing 602. In other words, the visual indicators 920 of the stencil 904 are inverted or upside-down when the first tab 962 is in the sensing slot 970 when the housing 602 is in the first orientation 2002.

FIG. 21 illustrates the meter 600 of the illustrated example in a second mounting orientation 2100 (e.g., a below-television mounting configuration). FIG. 21 illustrates the example meter 600 with the cover 902 and the stencil 904 removed from the housing 602 for illustrative purposes. In the second mounting orientation 2100, the housing 602 of the illustrated example is oriented in a second orientation 2102 and the stencil 904 is oriented in the first direction 2004 (e.g., the upright orientation). For example, when the housing 602 is in the second orientation 2102, the mounting surface 608 of the housing 602 is oriented in an upward direction in the orientation of FIG. 21. In addition, when the lights 930 illuminates the respective the visual indicators 920, the illuminated visual indicators 920 are presented in an upright orientation even though the housing 602 (e.g., and the cover 902) is in the second orientation 2102 (e.g., an upside down orientation).

Additionally, when the housing 602 is in a second orientation (e.g., the second mounting orientation 200 of FIG. 2), the meter 600 of the illustrated example determines if the stencil 904 is properly oriented relative to the housing 602. For example, the sensor 960 and the sensing slot 970 are positioned on a left side in the orientation of FIG. 21 (i.e., the housing 602 is inverted or flipped upside down or rotated 180 degrees). When the housing 602 of the illustrated example is in the second orientation and the second tab 964 is not sensed by the sensor 960, the meter 600 of the illustrated example determines that the stencil 904 is properly oriented relative to the display area 922 and/or the orientation of the housing 602. When for example the housing 602 of the illustrated example is in the second orientation and the second tab 964 is sensed by the sensor 960 (e.g., the second tab 964 is positioned in the sensing slot 970), the meter 600 of the illustrated example determines that the stencil 904 is improperly oriented relative to the display area 922 and/or the orientation of the housing 602.

FIG. 22 is a partial, perspective view the example meter 600 mounted to an example media device 2200 (e.g., a television) in the first mounting orientation 2000. In the first mounting orientation 2000, the meter 600 of the illustrated example is configured for an above-media device mounting configuration. As shown in FIG. 22, the first visual indicator 920a is illuminated to identify that a panelist (e.g., the panelist 106 of FIG. 1) assigned to the first visual indicator 920a is present in a media presentation environment. The illuminated first visual indicator 920a of the stencil 904 is presented in the first direction 2004 (e.g., an upright or right side up orientation).

For example, in the first mounting orientation 2000, the meter 600 of the illustrated example is coupled or attached to an upper surface or upper frame 2202 of the media device 2200 (e.g., via adhesive). More specifically, the mounting areas 1902 (FIG. 14) of the example housing 602 are (e.g., directly) coupled to or engaged with the upper frame 2202 of the media device 2200. However, in some examples, the meter 600 may be coupled to the upper frame 2202 via a clamp, a fastener, Velcro®, tape, a clip, a mechanical fastener, a chemical fastener and/or any other fastener(s).

In addition, the meter 600 of the illustrated example has a relatively low profile or dimensional envelope compared to the media device 2200. For example, the first dimension 616 is substantially similar to a dimension 2204 (e.g., a dimensional thickness) of the upper frame 2202. For example, the first dimension 616 of the meter 600 of the illustrated example is slightly less than the dimension 2204 of the upper frame 2202 of the media device 2200. In some examples, the dimension 2204 of the media device 2200 may be between approximately 7 millimeters (0.28 inches) and 75 millimeters (e.g., 3 inches).

FIG. 23 is a perspective view the example meter 600 mounted to the example media device 2200 in the second mounting orientation 2100. In the second mounting orientation 2100, the meter 600 of the illustrated example is configured for a below-media device mounting configuration. For example, the meter 600 of the illustrated example is coupled to a lower surface or frame 2302 of the media device 2200. More specifically, the mounting areas 1902 of the housing 602 are (e.g., directly) coupled to or engaged with the lower frame 2302 of the media device 2200. As shown in FIG. 23, the first visual indicator 920a is illuminated to identify that a panelist (e.g., the panelist 106 of FIG. 1) assigned to the first visual indicator 920a is present in the media presentation environment. Thus, although the housing 602 is in the second orientation 2102 (e.g., an upside down orientation), the first visual indicator 920a is displayed in the upright orientation.

Figure 24:
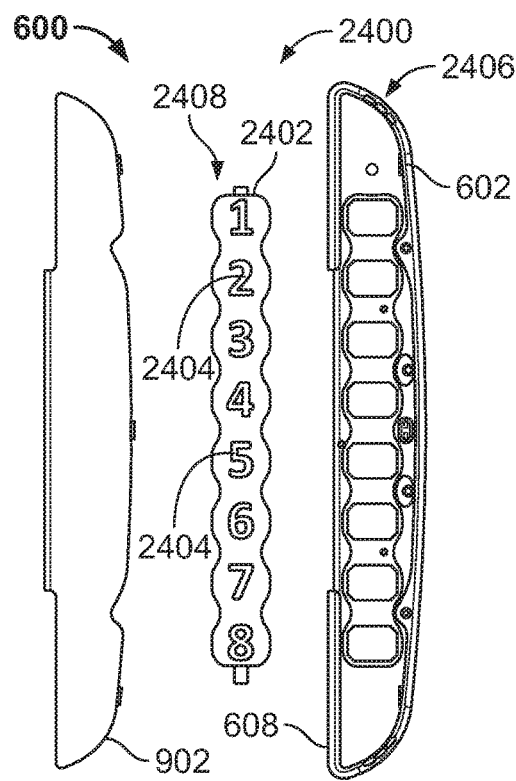
FIG. 24 is a partially exploded view of the example meter of FIGS. 6-8 shown in a third mounting configuration.

FIG. 24 illustrates the example meter 600 disclosed herein configured in a third mounting orientation 2400 (e.g., the third mounting configuration 300 of FIG. 3). To configure the meter 600 for mounting in the third mounting orientation 2400, the example meter 600 employs a stencil 2402. In some examples, the stencil 2402 of the illustrated example is interchangeable with the stencil 904 to configure the meter 600 for mounting in the third mounting orientation 2400.

The stencil 2402 of the illustrated example has the same or substantially similar dimensional profile as the stencil 904. For example, a dimensional length and/or a perimeter shape of the stencil 2402 of the illustrated example is substantially similar to a dimensional length and/or a perimeter shape of the stencil 904. Thus, the display 604 of the meter 600 and/or the display area 922 of the example housing 602 of the illustrated example provides a modular display to enable interchangeability between different stencils such as, for example, the stencil 2402 and the stencil 904. In the illustrated example, the stencil 2402 includes visual indicators 2404 (e.g., indicia). In particular, the visual indicators 2404 are numerals presented in a portrait orientation to enable mounting the meter 600 to side surfaces (e.g., vertical surfaces) of the media device 2200. Thus, unlike the stencil 904, which presents the visual indicators 920 in a landscape orientation, the example stencil 2402 of the illustrated example presents the visual indicators 2404 in the portrait orientation. In some examples, the visual indicators 2404 may have, for example, text, alpha-numeric characters, symbols, and/or any other indicia.

In the example of FIG. 24, the cover 902 and the stencil 2402 of the illustrated example are shown removed from the housing 602 for illustrative purposes. The housing 602 is shown in a third orientation 2406 and the stencil 2402 is shown in a third orientation or a third direction 2408. In the third direction 2408, the visual indicators 2404 of the stencil 2402 display in an upright orientation. The mounting surface 608 of the housing 602 is oriented in a leftward orientation in the third mounting orientation 2400 of FIG. 24.

Figure 25:
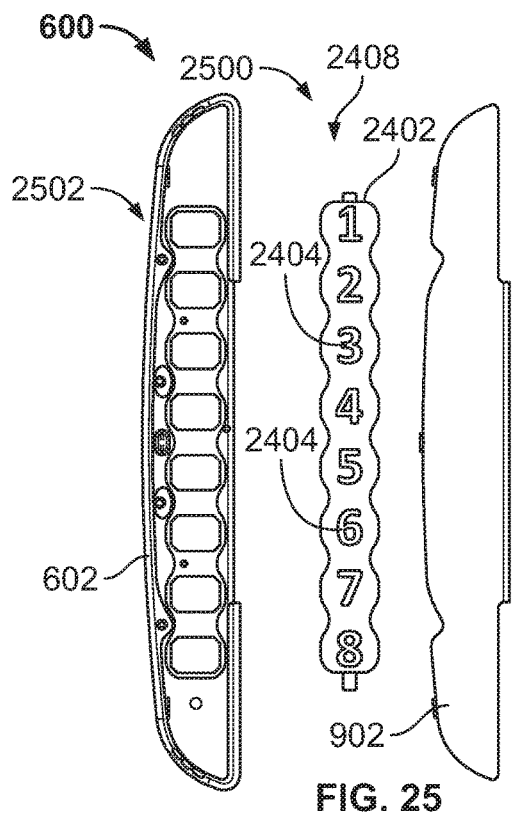
FIG. 25 is a partially exploded view of the example meter of FIGS. 6-8 shown in a fourth mounting configuration.

FIG. 25 illustrates the meter 600 of the illustrated example of FIG. 24 oriented in a fourth mounting orientation 2500 (e.g., the fourth mounting configuration 301 of FIG. 3). In the illustrated example, the cover 902 and the stencil 2402 are removed from the housing 602 for illustrative purposes. In the illustrated example of FIG. 25, the housing 602 of the illustrated example is shown in a fourth orientation 2502 and the stencil 2402 is positioned in the third direction 2408 (e.g., the upright orientation). For example, the visual indicators 2404 of the stencil 2402 of the illustrated example are shown in an upright orientation (e.g., similar to the orientation of FIG. 24). The stencil 2402 may be coupled to the display area 922 in the third direction 2408 while the housing 602 is in the fourth orientation 2502. In this manner, when the lights 930 illuminate the respective visual indicators 2404, the illuminated visual indicators 2404 appear in an upright orientation even though the housing 602 (e.g., and the cover 902) is in the fourth orientation 2502.

Figure 26:
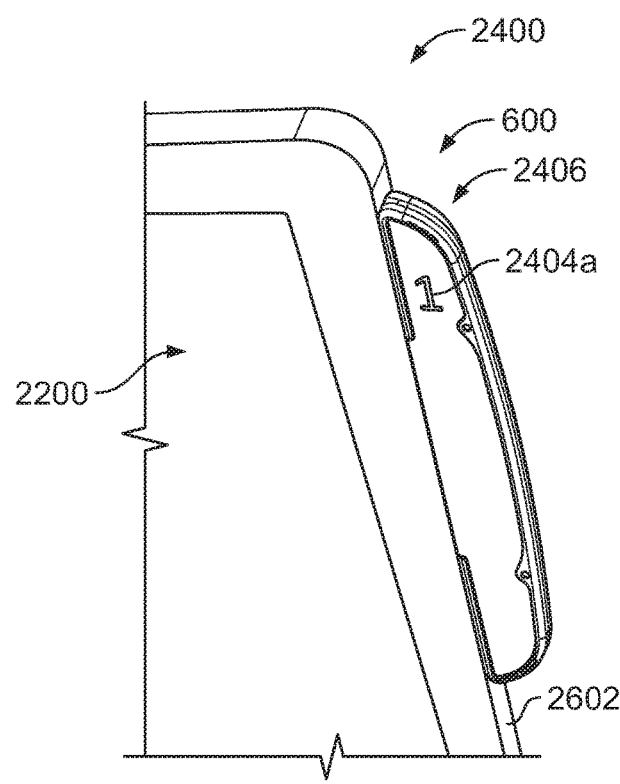
FIG. 26 is a flowchart of an example method of manufacturing an example meter implemented in accordance with the teachings of this disclosure.

FIG. 26 is a partial, perspective view the example meter 600 mounted to the example media device 2200 (e.g., a television) in the third mounting orientation 2400. In the third mounting orientation 2400, the meter 600 of the illustrated example is configured for a right-side media device mounting configuration. For example, in the third mounting orientation 2400, the meter 600 of the illustrated example is coupled to an right surface or right-side frame 2602 of the media device 1700. As shown in FIG. 26, a first visual indicator 2404*a* is illuminated to identify that a panelist (e.g., the panelist 106 of FIG. 1) assigned to the first visual indicator 2404*a* is present in a media presentation environment. As shown in FIG. 26, although the housing 602 is in the third orientation 2406, the first visual indicator 2404*a* is in an upright or right side up orientation.

Figure 27:
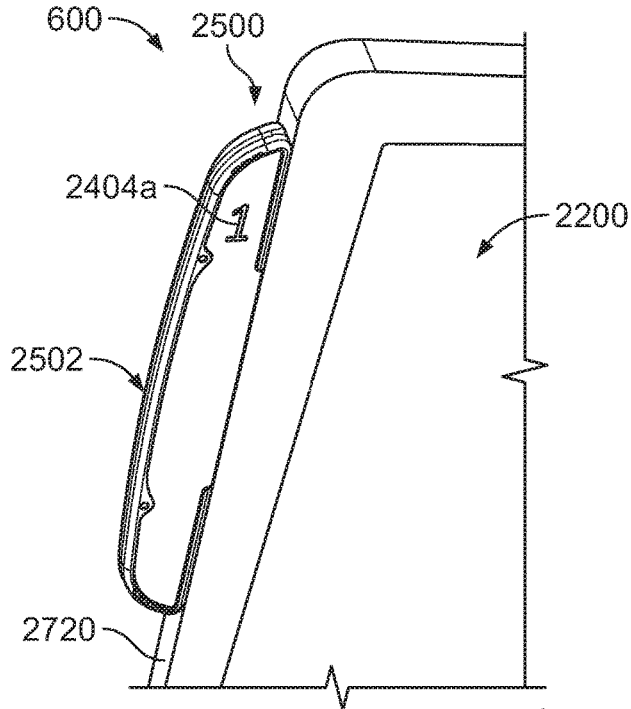
FIG. 27 illustrates the example meter of FIGS. 6-8 mounted to a media device in the third mounting configuration.

FIG. 27 is a perspective view the example meter 600 mounted to the example media device 2200 in the fourth mounting orientation 2500. In the fourth mounting orientation 2500, the meter 600 is configured for a left-side media device mounting configuration. For example, the meter 600 of the illustrated example is coupled to a left-side surface or frame 2702 of the media device 2200. As shown in FIG. 27, the first visual indicator 2404*a* is illuminated to identify that a panelist (e.g., the panelist 106 of FIG. 1) assigned to the first visual indicator 2404*a* is present in the media presentation environment. Thus, although the housing 602 is in the fourth orientation 2502, the first visual indicator 2404*a* is in an upright or right side up orientation.

Figure 28:
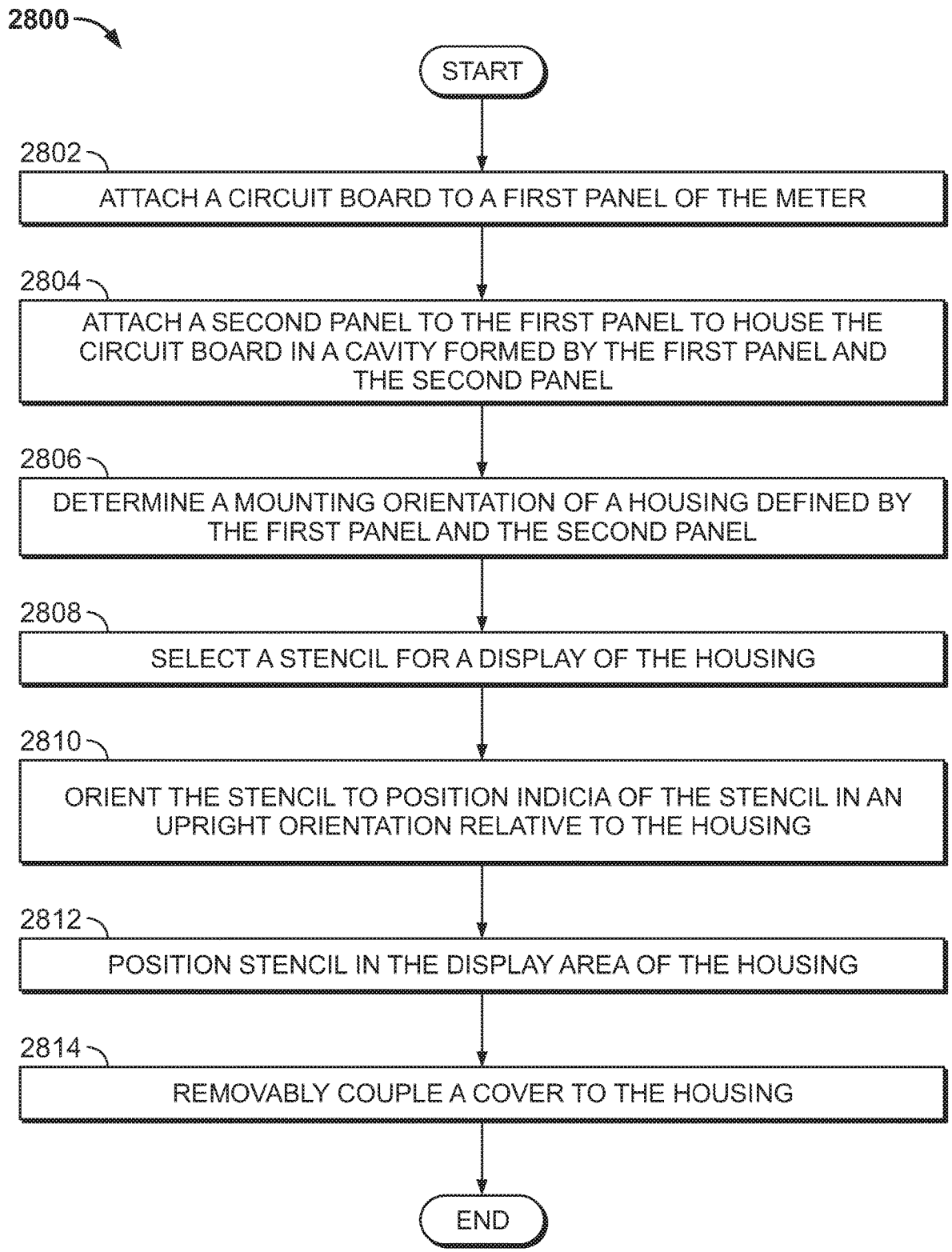
FIG. 28 illustrates the example meter of FIGS. 6-8 mounted to the media device in the fourth mounting configuration.

FIG. 28 illustrates an example manner of assembling and/or distributing a meter (e.g., the example meter 102 and/or 600). Although the example method 2800 is described with reference to the flowchart illustrated in FIG. 28, many other methods of configuring the example meters disclosed herein (e.g., the meters 102 and/or 600) may alternatively be used. For example, the order of execution of the blocks may be changed, and/or some of the blocks described may be changed, eliminated, or combined.

The method of FIG. 28 begins by attaching a circuit board to a first panel (block 2802) of the meter 102, 600. For example, the circuit board 912 is coupled to the first panel 908 via, for example, fastener(s). In some examples, prior to attaching the circuit board 912 to the first panel 908, one or more diffusors 914 and 938 may be coupled to the respective openings 926 and 936 of the first panel 908.

A second panel is attached to the first panel to house the circuit board in a cavity formed by the first panel and the second panel (block 2804). For example, the second panel 910 is attached to the first panel 908 to house the circuit board 912 and/or the components 906.

The orientation of a housing defined by the first panel and the second panel is then determined (block 2806). For example, the housing 602 may be positioned in the first mounting orientation 2000 (e.g., for an above-media device mounting configuration), the second mounting orientation 2100 (e.g., for below-media device mounting configuration), the third mounting orientation 2400 (e.g., for a left-side media device mounting configuration), or the fourth mounting orientation 2500 (e.g., for a right-side media device mounting configuration).

A stencil is selected for a display of the housing (block 2808). For example, the stencil 904 or the stencil 2402 may be selected. For example, the stencil 904 is selected when the orientation of the meter 600 is the first mounting orientation 2000 or the second mounting orientation 2100, and the stencil 2402 is selected when the orientation of the meter 600 is the third mounting orientation 2400 or the fourth mounting orientation 2500.

The selected stencil is oriented to position indicia of the stencil in an upright orientation relative to the housing (block 2810). For example, the stencil 904 is positioned in the first direction 2004 to position the visual indicators 920 in an upright orientation relative to the housing 602 when the housing 602 is in the first orientation 2002 or the second orientation 2102. Likewise, the stencil 2402 is positioned in the third direction 2408 to position the visual indicators 2404 in an upright orientation relative to the housing 602 when the housing 602 is in the third orientation 2406 or the fourth orientation 2502.

The selected stencil is positioned in a display area of the housing (block 2812). For example, the stencil 904 or 2402 is positioned in the display area 922 of the housing 602. In particular, the stencil 904 or the stencil 2402 is positioned in the housing 602 such that the visual indicators 920 or 2404, respectively, are in the upright position or orientation. A cover is removably coupled to the housing (block 2814). For example, the cover 902 is attached to the housing 602.

At least some of the aforementioned examples include one or more features and/or benefits including, but not limited to, the following:

In some examples, a meter apparatus includes a housing having a display area. In some such examples, at least one of a first stencil or a second stencil is to be removably positionable in the display area of the housing. In some such examples, the first stencil has indicia oriented in a landscape orientation and the second stencil has indicia oriented in a portrait orientation. In some such examples, the at least one of the first stencil or the second stencil is to be positioned in the display area of the housing such that the indicia of the at least one of the first stencil or the second stencil is in an upright orientation relative to the housing. In some such examples, the meter apparatus includes a cover removably coupled to the housing to enable access to the display area.

In some examples, the housing has a dimensional length of approximately between 6 inches and 12 inches.

In some examples the dimensional length is approximately 10 inches.

In some examples, the housing has a dimensional thickness of approximately between 0.50 inches and 1.0 inches.

In some examples, the dimensional thickness is approximately 0.85 inches.

In some examples, the housing has a dimensional height of approximately between 1.0 inch and 1.25 inches.

In some examples, the dimensional height is approximately 1 inch.

In some examples, the housing is to be positioned in at least one of a first orientation or a second orientation different than the first orientation when the first stencil is coupled to the housing.

In some examples, the housing is to be positioned in at least one of a third orientation or a fourth orientation different than the third orientation when the second stencil is coupled to the housing, where the third orientation and the fourth orientation being different from the first orientation and the second orientation.

In some examples, the first stencil is interchangeable with the second stencil.

In some examples, the at least one of the first stencil or the second stencil includes indicia representative of a panelist.

In some examples, at least one of the first stencil or the second stencil includes a plurality of numerals in ascending order.

In some examples, the at least one of the first stencil or the second stencil is repositionable relative to the housing to orient the indicia in an the upright orientation.

In some examples, the meter apparatus includes a circuit board housed by the housing. In some such examples, the meter apparatus includes a first antenna and a second antenna. In some such examples, the first antenna is positioned on a first surface of the circuit board and the second antenna is positioned on a second surface of the circuit board opposite the first surface.

In some examples, the first antenna is positioned adjacent a first edge of the circuit board and the second antenna is positioned on a second edge of the circuit board opposite the first edge.

In some examples, the meter apparatus includes a plurality lights coupled to the circuit board. In some such examples, a first light of the plurality of lights is positioned adjacent the first edge of the circuit board and a second light of the plurality of lights is positioned adjacent the second edge of the circuit board. In some such examples, the first antenna is spaced from the second antenna by at least a distance defined between the first light and the second light.

In some examples, the meter apparatus includes a first audio sensor positioned on the first surface of the circuit board and a second audio sensor positioned on the second surface of the circuit board.

In some examples, a method to assemble a meter includes attaching a circuit board to a first panel. In some such examples, the method includes attaching a second panel to the first panel to house the circuit board in a cavity formed by the first panel and the second panel. In some such examples, the method includes determining a viewing orientation of a housing defined by the first panel and the second panel. In some such examples, the method includes selecting a stencil for a display of the housing. In some such examples, the method includes orientating the stencil to position indicia of the stencil in an upright orientation relative to the housing. In some such examples, the method includes positioning the stencil in the display area of the housing. In some such examples, the method includes attaching a cover to the housing.

In some examples, the selecting of the stencil for the display of the housing includes selecting the stencil based on the determined viewing orientation.

In some examples, the method includes coupling a plurality of diffusors in respective openings of the first panel prior to attaching the circuit board to the first panel.

In some examples, the determining of the viewing orientation of the housing includes orientating the housing in at least one of a first mounting orientation, a second mounting orientation, a third mounting orientation, or a fourth mounting orientation.

In some examples, the selecting of the stencil includes selecting a first stencil when the determined viewing orientation of the housing is the first mounting orientation or the second mounting orientation. In some such examples, the method includes selecting a second stencil different than the first stencil when the determined mounting orientation of the housing is the third mounting orientation or the fourth mounting orientation.

In some examples, the method includes interchanging the first stencil with a second stencil after the first stencil is coupled to the housing.

In some examples, the method includes positioning a first antenna to a first surface of the circuit board and positioning a second antenna to a second surface of the circuit board opposite the first surface.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A meter apparatus comprising:
   a housing to contain a metering circuit of the meter apparatus, the housing having a display area, the display area having a first recessed cavity and a second recessed cavity adjacent the first recessed cavity, the first recessed cavity being offset relative to the second recessed cavity such that the second recessed cavity defines a front surface of the display area and a peripheral lip of a front side of the housing, the housing structured to attach to a body of a media presentation device in at least one of a landscape orientation or a portrait orientation;

a stencil removably coupled to the first recessed cavity of the display area; and a cover removably coupled to the housing to enable access to the display area, the second recessed cavity of the housing to receive the cover, wherein the cover includes a clip to removably couple the cover and the housing.

2. The meter apparatus of claim 1, wherein the cover is received by the second recessed cavity such that an outer surface of the cover is substantially flush mounted relative to a peripheral lip of the housing, and wherein a perimeter of the cover is substantially similar to a perimeter of the peripheral lip.

3. The meter apparatus of claim 1, wherein the stencil has identifiers representative of one or more panelists viewing media presented by a media device associated with the meter apparatus and, further including, a circuit board to illuminate only an identifier of the stencil representative of a panelist present for a presentation on a media device communicatively coupled to the metering apparatus.

4. The meter apparatus of claim 1, wherein the clip includes a tab to operate the tab and enable a user to remove the cover from the housing.

5. The meter apparatus of claim 1, wherein the cover includes a first portion to cover the display area and a second portion including the clip that extends at least partially along a second surface of the housing that is non-parallel relative to the display area.

6. The meter apparatus of claim 1, wherein the cover has an L-shaped cross-section.

7. The meter apparatus of claim 1, wherein a front surface the stencil is to be flush mounted relative to the front surface of the display area defined by the second recessed cavity such that indicia of the stencil is in an upright orientation relative to the housing.

8. The meter apparatus of claim 1, wherein the first recessed cavity includes a first perimeter that is substantially similar to a perimeter of the stencil such that the first recessed cavity mateably receives the stencil.

9. The meter apparatus of claim 1, wherein the stencil is accessible in response to removing the cover from the housing.

10. A meter apparatus comprising:

a housing having a display area structured to receive a stencil having identifiers representative of panelist viewing media presented by a media device associated with the meter apparatus, the housing having a mounting surface that is structured to removably couple to a side surface of a body of a media presentation device and structured to be positioned in at least one of a first orientation or a second orientation different than the first orientation;

a circuit board housed by the housing;

a first antenna and a second antenna, the first antenna configured to operate independently from the second antenna, the first antenna being positioned on a front surface of the circuit board and the second antenna positioned on a rear surface of the circuit board opposite the first surface, the first antenna and the second antenna being positioned between perimeter edges of the circuit board;

a plurality of lights coupled to the circuit board, a first light of the plurality of lights being positioned adjacent a first side edge of the circuit board and a second light of the plurality of lights being positioned adjacent a second side edge of the circuit board opposite the first side edge, the first antenna being spaced from the second antenna by at least a distance measured from the first light to the second light; and a cover removably coupled to the housing to enable access to the display area to access the stencil, wherein the cover is removably coupled to the housing via a snap-fit connection.

11. The meter apparatus of claim 10, wherein the display area is defined by a wall having a plurality of openings, wherein respective ones of the identifiers align with respective ones of the openings when the stencil is coupled to the display area, and wherein respective ones of the lights to align with respective ones of the openings, the circuit board to illuminate an identifier of the stencil representative of a panelist present for a presentation on a media device communicatively coupled to the metering apparatus.

12. The meter apparatus of claim 10, wherein the stencil includes at least one of a first stencil or a second stencil to be removably positionable in a display area of the housing, the first stencil having indicia oriented in a landscape orientation and the second stencil having indicia oriented in a portrait orientation, the at least one of the first stencil or the second stencil to be positioned in the display area of the housing such that the indicia of the at least one of the first stencil or the second stencil is in an upright orientation relative to the housing.

13. The meter apparatus of claim 10, wherein the first antenna is to transmit a WIFI signal and the second antenna is to transmit a Bluetooth signal.

14. The meter apparatus of claim 10, wherein the cover includes a clip to removably couple the cover and the housing.

15. The meter apparatus of claim 14, wherein the clip includes a tab to operate the tab and enable a user to remove the cover from the housing.

16. A meter apparatus comprising:

a housing having a first housing portion and a second housing portion that couple together to define a cavity between an inner surface of the first housing portion and an inner surface of the second housing portion to receive electronic components of the meter apparatus, the first housing portion defining a wall having an outer surface that defines a display area, the wall having a plurality of spaced apart openings;

a plurality of diffusors positioned in the cavity of the housing, respective ones of the diffusors to align with respective ones of the openings;

at least one of a first stencil or a second stencil to be removably positionable in the display area of the housing, the first housing portion being positioned between the diffusors and the at least one of the first stencil or the second stencil when the at least one of the first stencil or the second stencil is coupled to the display area of the housing;

a cover removably coupled to the housing to enable access to the display area, the cover including a clip to removably couple to the housing, the cover having a first portion to cover the display area and a second portion to extend along a surface of the housing that is non-parallel relative to the display area;

a circuit board housed by the housing; and a first antenna and a second antenna, the first antenna being positioned on a first surface of the circuit board and the second antenna being positioned on a second surface of the circuit board opposite the first surface, the first antenna positioned adjacent a first side edge of the circuit board and the second antenna positioned on a second side edge of the circuit board opposite the first side edge.

17. The meter apparatus of claim 16, further including a plurality of lights coupled to the circuit board, a first light of the plurality of lights positioned adjacent the first edge of the circuit board and a second light of the plurality of lights positioned adjacent the second edge of the circuit board, the first antenna spaced from the second antenna by at least a distance measured from the first light to the second light.

18. The meter apparatus of claim 16, further including a first audio sensor positioned on the first surface of the circuit board and a second audio sensor positioned on the second surface of the circuit board.

19. The meter apparatus of claim 16, wherein the housing has a mounting surface that is structured to removably couple to a body of a media presentation device and structured to be positioned on the media presentation device in at least one of a landscape orientation or a portrait orientation, and wherein the first stencil has indicia oriented in a landscape orientation and the second stencil has indicia oriented in a portrait orientation, the at least one of the first stencil to be positioned in the display area when the housing is in the landscape orientation to present the indicia of the first stencil is in an upright orientation relative to the housing or the second stencil to be positioned in the display area when the housing is in the portrait orientation to present the indicia of the second stencil is in an upright orientation relative to the housing.

* * * * *